United States Patent [19]

Coons

[11] Patent Number: 4,960,085

[45] Date of Patent: Oct. 2, 1990

[54] PNEUMATIC AND ELECTRO-PNEUMATIC STARTERS

[75] Inventor: Terry L. Coons, Dayton, Ohio

[73] Assignee: Tech Development Inc., Dayton, Ohio

[21] Appl. No.: 239,189

[22] Filed: Aug. 31, 1988

[51] Int. Cl.$^5$ .......................... F02N 7/00; F01D 5/34
[52] U.S. Cl. .................................. 123/179 F; 60/625; 60/626; 415/202; 415/217.1; 416/241 A
[58] Field of Search ............... 123/179 F; 416/241 A; 415/217.1, 202; 60/625, 626

[56] References Cited

U.S. PATENT DOCUMENTS

| | | | |
|---|---|---|---|
| 2,154,572 | 4/1939 | Lansing | 123/179 F |
| 2,675,708 | 4/1954 | Orbeck | 123/179 F |
| 2,721,482 | 10/1955 | Shank et al. | 123/179 F |
| 2,880,578 | 4/1959 | Nardone | 123/179 F |
| 3,095,821 | 7/1963 | Elenbaas | 416/241 A |
| 3,359,908 | 12/1967 | Toma | 415/202 |
| 3,594,102 | 7/1971 | Oden | 415/217.1 |
| 3,664,760 | 5/1972 | Reiner | 415/217.1 |
| 4,832,573 | 5/1989 | Dorski | 415/217.1 |

*Primary Examiner*—Andrew M. Dolinar
*Attorney, Agent, or Firm*—Jerome P. Bloom

[57] ABSTRACT

Engine pre-engage starters formed of compactly interfit sections featuring a universally applicable high speed turbine rotor, formed preferably of nylon based plastic, the body of which is distinguished by low tensile strength, high impact resistance, radial growth and adjustment in correspondence with the speed of its rotation, minimal evidence of stress and no material fracture even under the most adverse conditions of its use and a structural composition which reduces to powder form when subjected to friction at such time the speed of its rotation reaches and exceeds a prescribed limit. The rotor is so connected with its power transmission shaft to position beyond and form an axial extension of one end thereof. The rotor is contained by a peripherally encompassing structurally complementary plastic buffer which enhances its fail safe properties. Optionally, the starter housing may be provided with discretely positioned sound deadening inserts. The starters illustrated each feature a highly simplified control system operative to effect a substantially instantaneous shutdown thereof when the speed of rotation of the rotor exceeds a predetermined limit. At the same time the nature of the rotor, the transmission shaft which it powers and the control system which it triggers to couple its transmission in driving relation to the engine to which it relates is such to produce a substantially instantaneous starting of the engine immediately of the energization of the rotor.

17 Claims, 7 Drawing Sheets

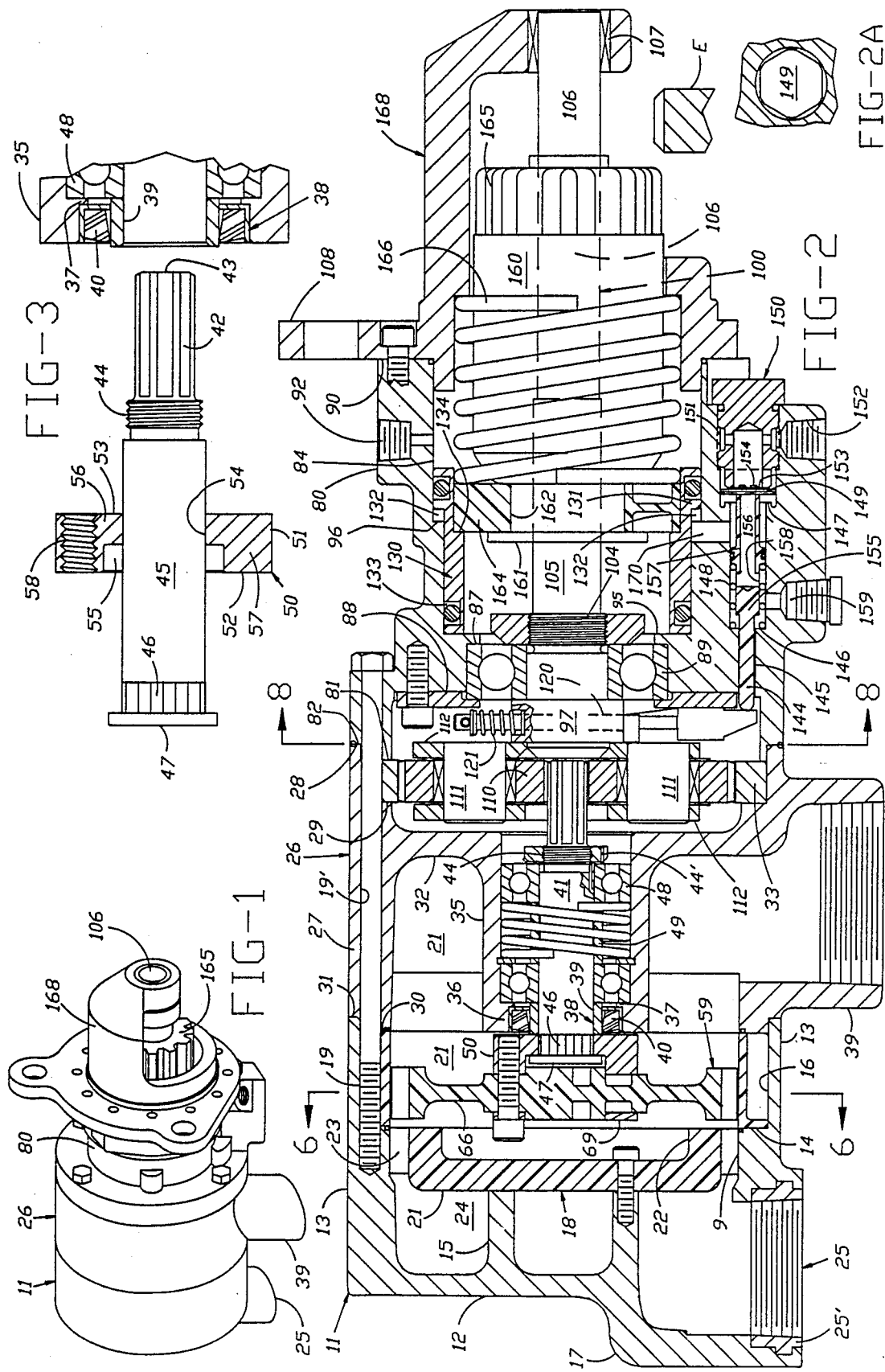

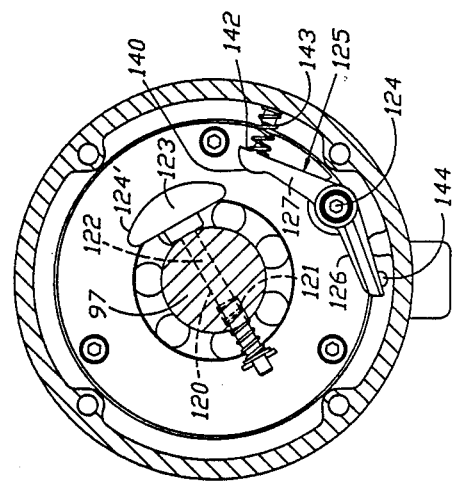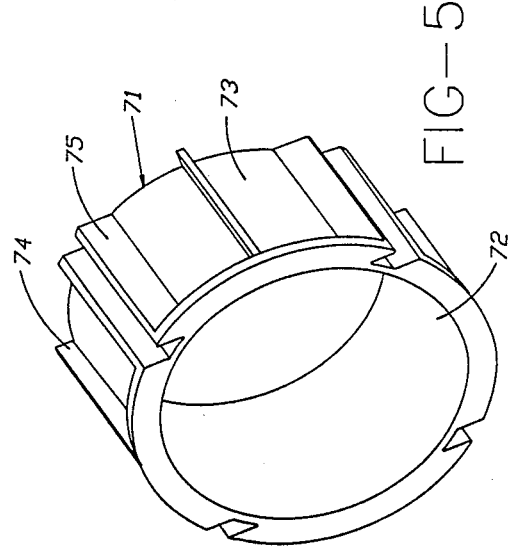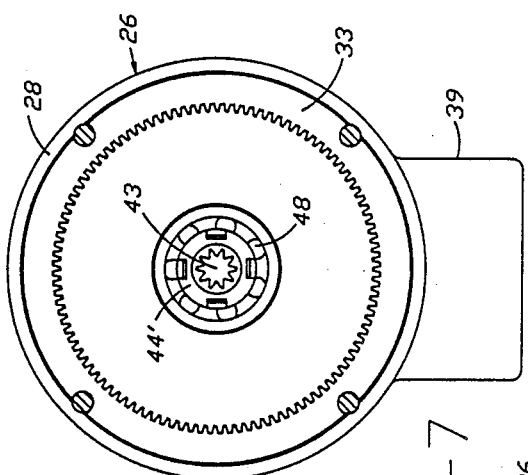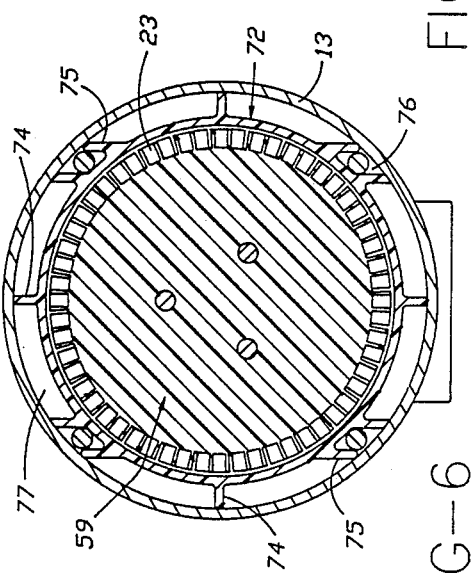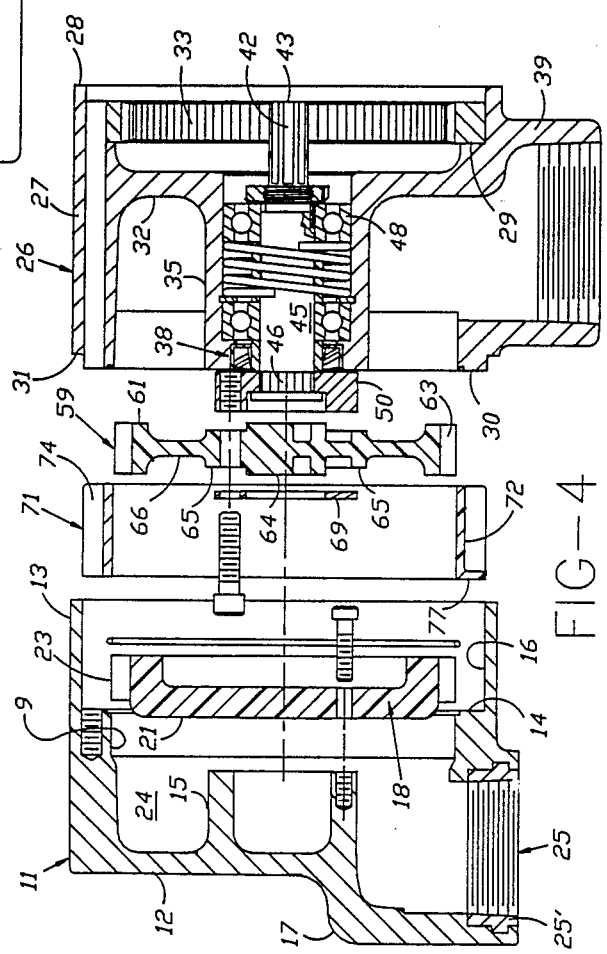

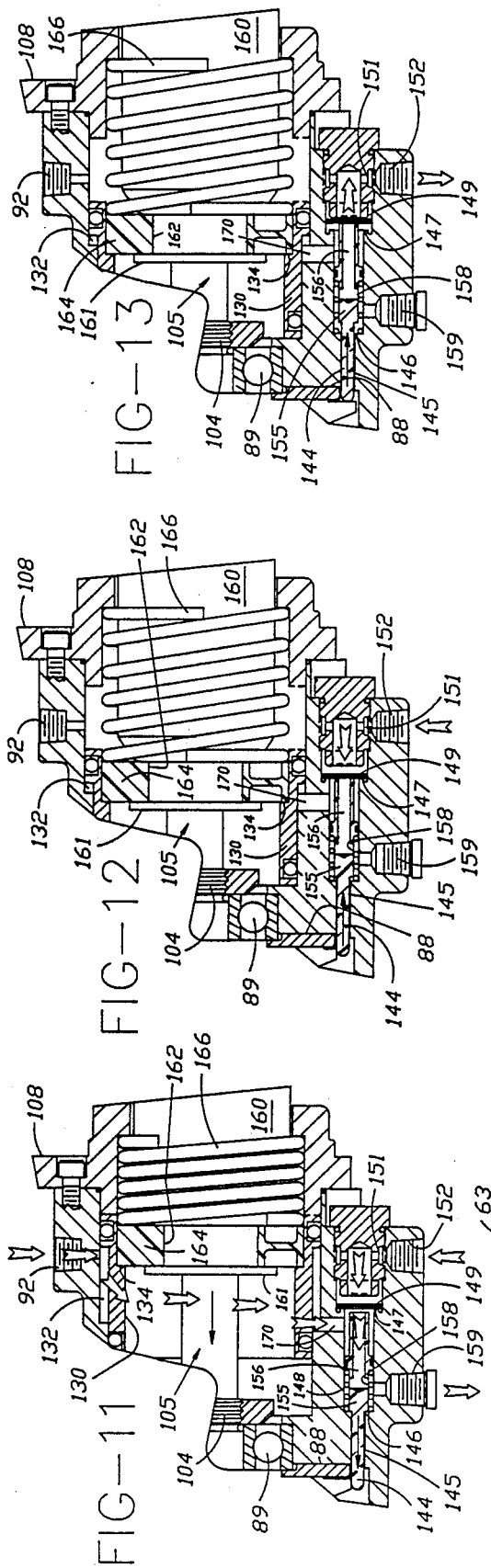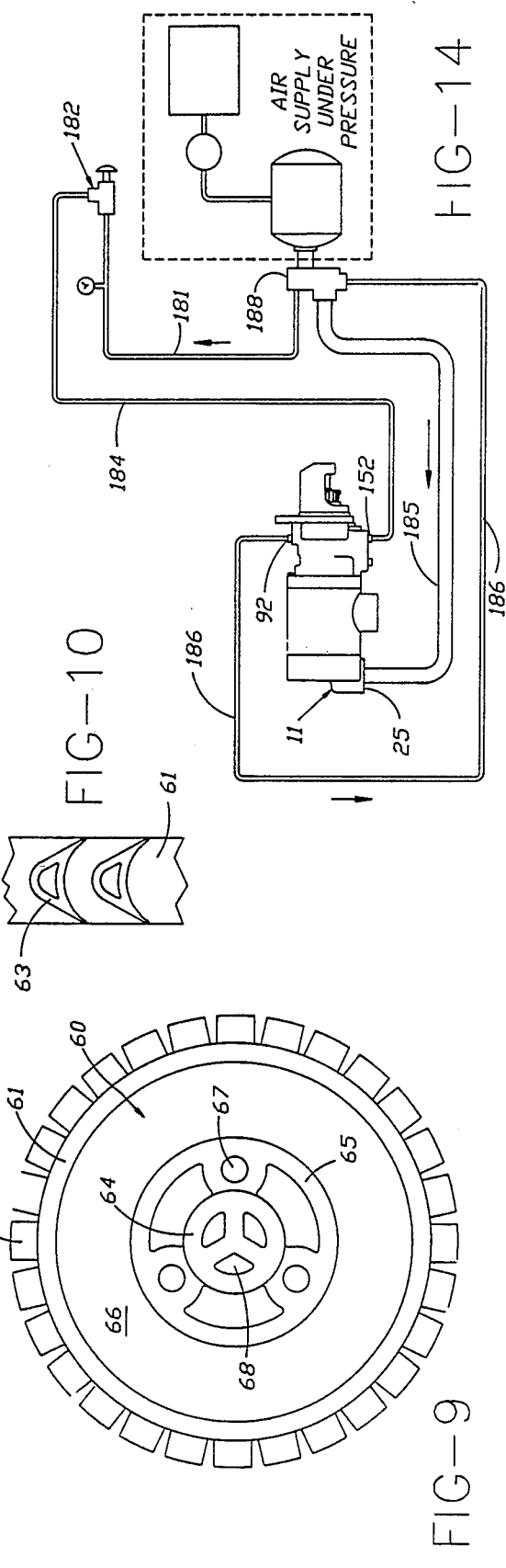

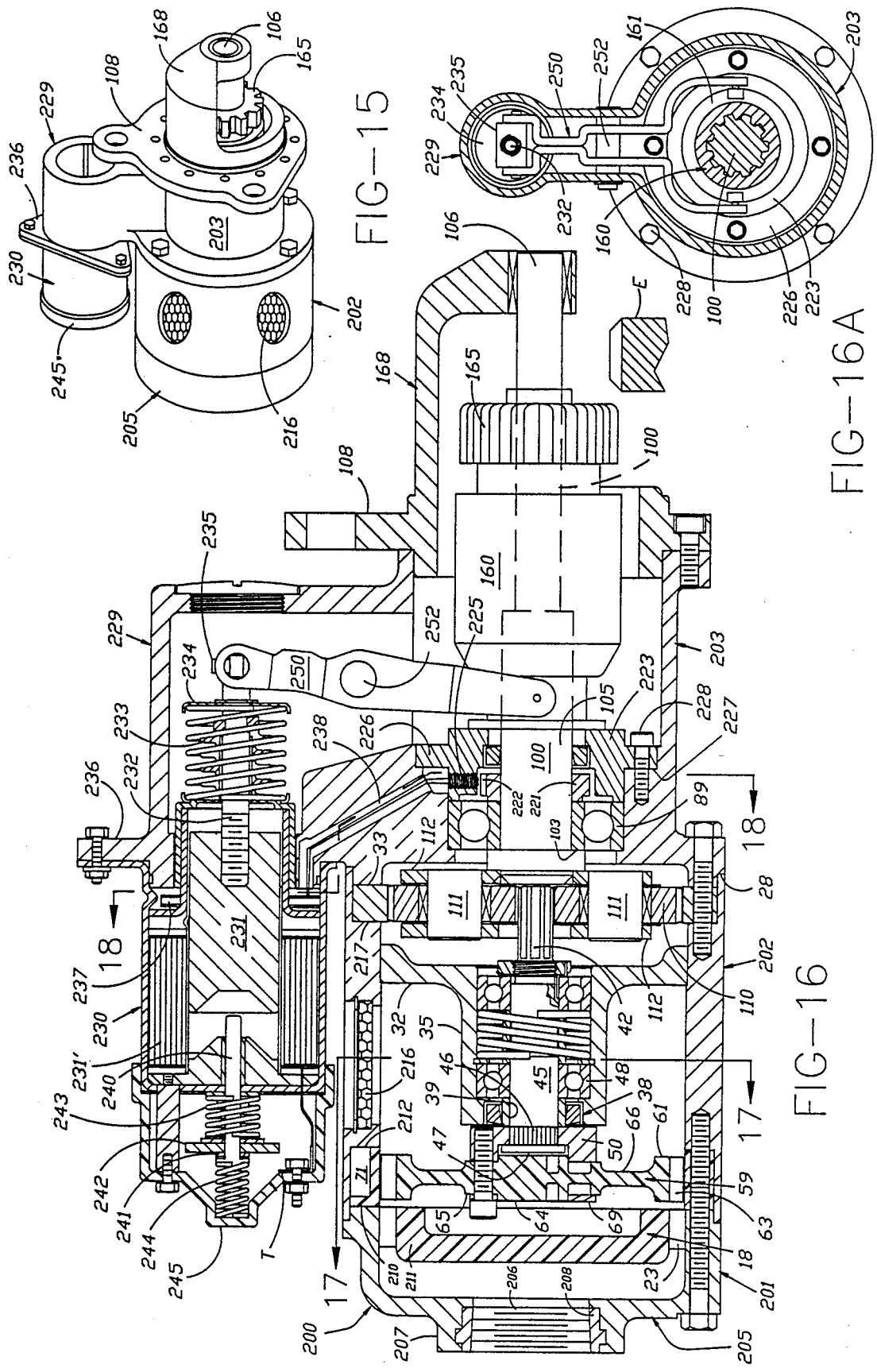

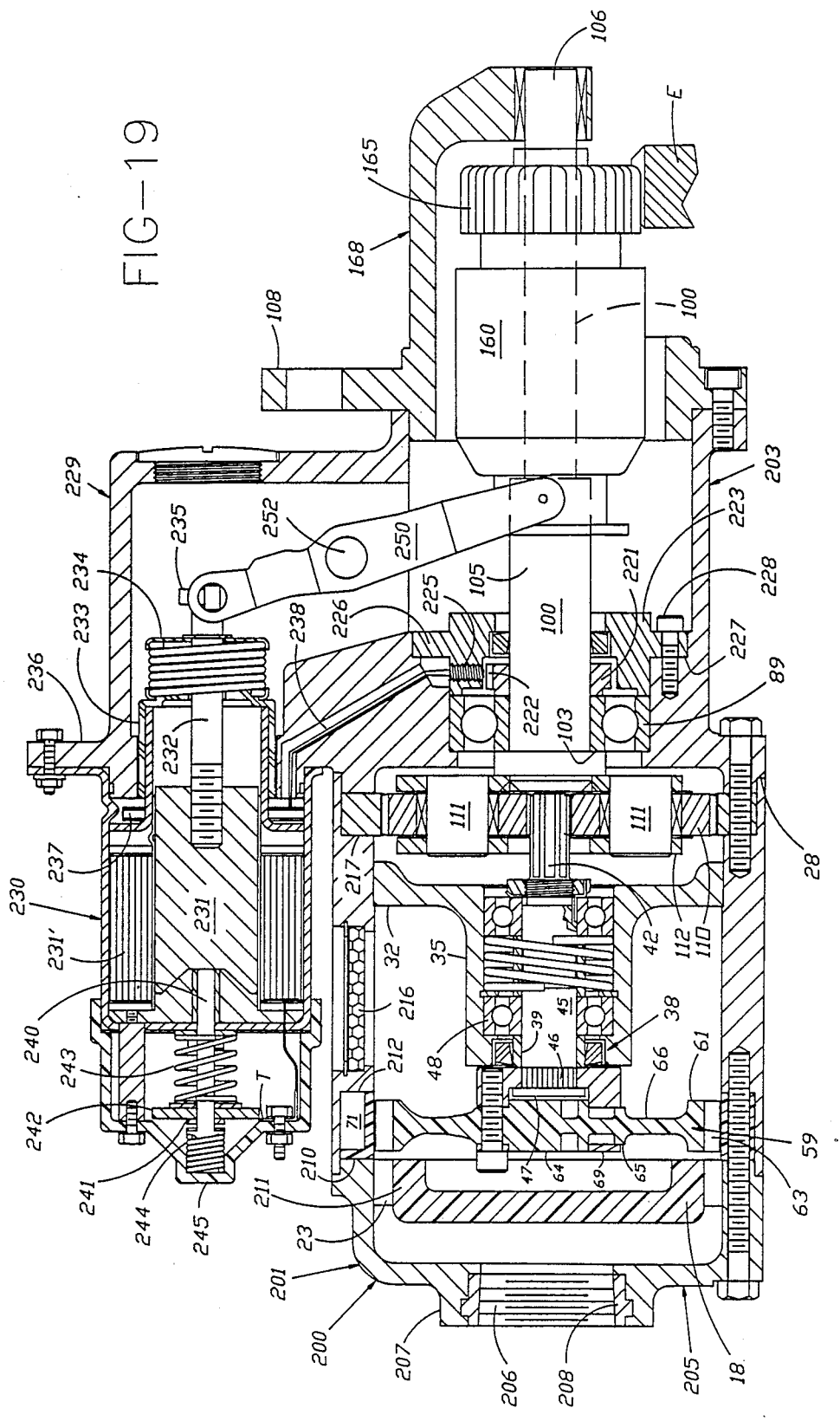

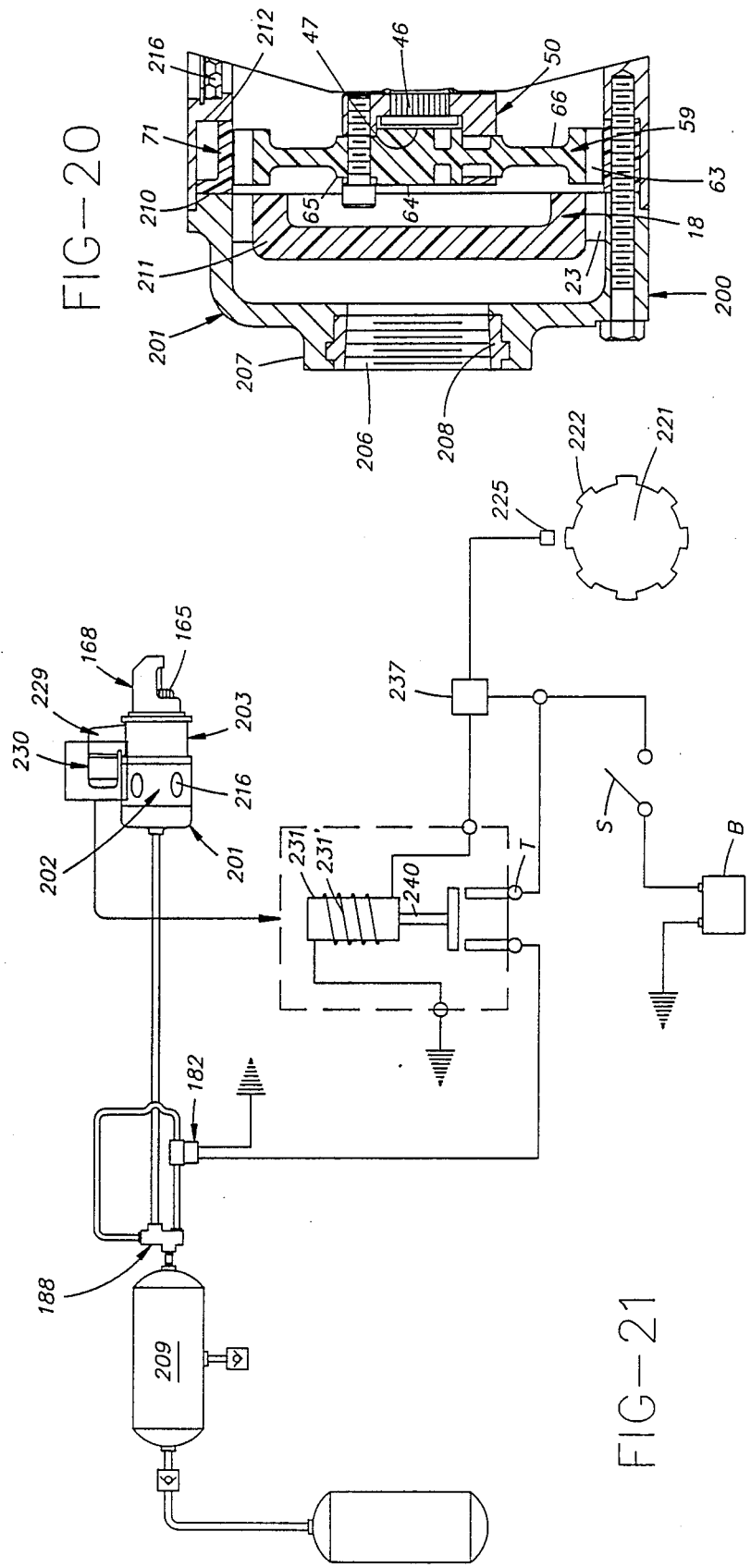

PNEUMATIC AND ELECTRO-PNEUMATIC STARTERS

BACKGROUND OF THE DISCLOSURE

The invention relates to improvements in the composition, format and componentry of pneumatic and electro-pneumatic starters and the interrelation and function of their parts, which, as compared to prior art devices of similar type and application, exhibit the fact that they are more economical to fabricate, easier to assemble, more efficient, satisfactory and fail safe in operation, safely and easily adaptable to a multitude of applications and endowed with an ability to operate over an extended period of time with minimal requirements for maintenance.

Illustrative embodiments herein set forth, by way of example and not by way of limitation, feature a new and significantly improved lightweight plastic rotor for use in turbine powered machinery and particularly advantageous for use in application to turbine powered starters. The form and substance of this rotor is such to negate the occurrence of fracture and dangerous fragmentation thereof even under the most adverse conditions of speed to which it may be subjected and to exhibit, as compared to prior art rotors of the same size and having the same application, a materially reduced incidence of stress in use. The illustrative embodiments further reveal a new and improved rotor shaft and rotor carrier contributing to a significant ease in achieving a balanced mount of such rotor to its power transmission shaft and a power transmission assembly featuring in use a faster acceleration and deceleration than that heretofore possible with high speed turbomachinery. The latter obviates the need for special braking devices such as heretofore employed oin such machinery. Another element of the present invention is a new and improved rotor shroud in the nature of a buffer which complements the plastic rotor of the invention.

Pneumatic and electro-pneumatic starters per the present invention are further distinguished, for any given application, as compared to the prior art, by their lighter and more compact constructions, lower cost, and a faster and more precise operation.

As indicated, the forgoing spells out effective solutions to numerous problems heretofore subject of much costly prior investigation and research without achievement of the same.

Most importantly the construction, composition and arrangement of pneumatic and electro-pneumatic starter per the present invention is such to insure that in the event of a predetermined dangerous level of speed of their power transmission assembly in use thereof such speed will inherently be immediately induced to abate or the starter will cease operation in a very few seconds thereafter.

Electro pneumatic embodiments of the invention in preferred form provided a most simplistic failsafe control system affording assured substantially instantaneous starting of the machinery to which they apply.

For comprehension of the import of the invention, attention is directed to U.S. Pat. No. 4,518,310 issued May 21, 1985; U.S. Pat. No. 4,507,047 issued Mar. 26, 1985 and, in particular, the present inventor's application for U.S. application Ser. No. 832,831, filed Feb. 24, 1986, now U.S. Pat. No. 4,830,571, the latter of which appears to be the only pertinent prior art.

Attention is directed to the fact that certain novel features of construction afforded by the invention subject of application Ser. No. 832,831 are included as part of the illustrative embodiments of the present invention.

SUMMARY

Embodiments of the starters of the present invention, herein illustrated, comprise a turbine rotor which has a low cost, plate-like, plastic body which is extremely light in weight, has low tensile strength, high impact resistance and toughness resisting fracture, evidences very little stress in use and an inherent capacity for radial adjustment at a modest rate from the point of its energization up to its designed operating speed, above which the rate of its radial growth is instantaneously and significantly accelerated and so structured that when peripheral surface portions thereof are subjected to friction under conditions wherein there is a high speed of its rotation the result is no more than a reduction of limited surface portions of the rotor to a harmless powder-like substance.

It has been found, in extensive testing of embodiments of this invention, that in use thereof they exhibit an overall most satifactory performance, assured function and effectiveness, durability and a degree of safety significantly exceeding that of turbin rotors of the prior art. It has also been established in test that such rotors exhibit a significantly lower rotating inertia than has been heretofore experienced in use of comparably sized rotors of the prior art for similar applications.

The rotor body is preferably formed of a nylon based resin which is free of internal reinforcement. An alternative use of polycarbonate and acetal resin material in fabrication thereof is practical but it is believed desirable that the use of such material be limited to certain applocations of the rotor.

One preferred embodiment of a turbine rotor per the present invention comprises a disc-shaped plastic body having a plate-like configuration distinguished by successively adjacent radial zones which which differ in thickness and include a central zone which is solid and exhibits its maximum thickness and a zone outwardly thereof having a lesser thickness including means through which said rotor may be mounted for its connection to a power transmission shaft. At the outer periphery of said rotor body is a ring of integrated, radially projected, cirrcumferentially spaced turbine buckets.

Another embodiment of a turbine rotor per the present invention, particularly advantageous for use in pneumatic and electro-pneumatic engine starter, comprises a disc shaped body the outer peripheral limit of which is defined by a series of circumferentially spaced turbine buckets inwardly of which said body has a solid, plate-like configuration, said body being integrally formed of material having a low coefficient of friction, low tensile strength and high impact resistance and being so structured as to have radial growth in correspondence with an increasing speed of its rotation, the rate of which growth is suddenly and sharply increased when the speed of such rotation exceeds the designed operating speed of the rotor.

Most significant, as proven in extensive testing thereof, rotors per the present invention, as compared to prior art rotors having similar application and rating, demonstrate a significantly improved ability to accommodate, distribute and dissipate applied stress and to preclude fracture or explosive fragmentation thereof that might be destructive of the machinery within which they are embodied with resulting injury to persons in the vicinity thereof.

A further feature of the present invention is a novel cup shaped rotor carrier which is adapted for its secure connection to one end portion of the shaft to which a rotor is intended to drivingly relate and to fixedly mount such rotor in bridging relation to the mouth thereof at a point outwardly of and beyond the adjacent end of the shaft to which the carrier mounts. In a preferred embodiment and application the base portion of the carrier is provided with a central aperture enabling its slip fit over the length of the shaft to that end portion thereof to which it mounts and said end portion of said shaft has an expanded head at its projected extremity which in the secured position of said carrier nests internally of said carrier and seats to the inner surface of its base immediately about said central aperture which accommodates the projection therethrough of the remainder of said shaft.

For use in preferred embodiments of an engine starter including a housing formed of series related interconnected sections within which a turbine rotor is contained, the invention provides a novel tubular buffer which positions immediately about and in peripherally containing relation to said rotor. This buffer is distinguished by its highly advantageous construction which enables it to inherently functionally and dynamically interact with the rotor in the course of its operation. The inner tubular portion of this buffer relatively smooth at its inner surface while its outer peripheral surface embodies projections by which it is spaced from means defining a bounding outer wall portion of the starter housing. The body of the buffer is fabricated of a plastic, preferably nylon based or a structured equivalent, which is compatible to the material of the rotor in that it inherently provides means which adjust and/or accommodates radial growth and inherent adjustment of the radial extent of the rotor body.

Another embodiment provides an engine starter including a rotor per the present invention, a starter housing composed of interfitting, interconnected, series related sections one of which defines a substantially cup-shaped end of said housing, means defining a turbine nozzle unit within and in adjacent relatively closely spaced relation to the base of said cup-shaped end, in transversely bridging relation to the bounding wall thereof and defining at the base end of said cup a shallow chamber having an inlet for delivery of air thereto under pressure, said unit including a circularly spaced series of nozzles defining only outlets from said chamber, said rotor being nested in said cup-shaped end of said housing in a recessed spaced relation to the mouth thereof to position the buckets thereof in axial alignment with said nozzles, said cup-shaped end further nesting a rotor carrier mounting said rotor as an axial extension thereof, said carrier being interconnected with said rotor to establish one face of a zone thereof which is outwardly of a central portion of said rotor in abutmemt therewith.

A further embodiment of the invention provides an electro-pnematic pre-engage starter including a housing composed of interfitting, interconnected series related sections one of which defines a shallow substantially cup-shaped end thereof, means defining a turbine nozzle unit within and in adjacent relatively closely spaced relation to the base of said cup-shaped end, in transversely bridging relation to the mouth of the bounding wall thereof and defining at the base end of said cup a very shallow chamber having an inlet for delivery of air thereto under pressure, said unit including a circularly spaced series of nozzles defining the only outlets from said chamber, a rotor per the present invention being nested in a section of said housing immediately following said cup-shaped end of said housing to position the buckets thereof in axial alignment with said nozzles, said following section further nesting a rotor carrier mounting said rotor as an axial extension thereof, said carrier being interconnected with said rotor to establish one face of a zone thereof which is outwardly of a central portion of said rotor in abutment therewith, a power transmission shaft, said carrier being secured to one end portion of said shaft to form a coaxial extension thereof, said shaft being extended through and in bearing relation to means within a third section of said housing immediately of said following section and having the opposite end portion thereof in coupled relation to further power transmission means extending through further sections of said housing beyond said following section one of which has an opening therein communicating with an additional section of said housing, said power transmitting means including a splined shaft portion thereof slidably mounting a torque transmitting drive assembly including an engine drive gear and means in connection therewith for triggering and controlling the movement thereof to and from the engine gear to which said engine drive gear relates, respectively in a substantially instantaneous response to the energization of said rotor to mesh with said engine gear and effect the starting of said engine and at such time as the engine has started or the speed of rotation of said rotor and correspondingly said transmission means exceeds the designed level of their operating speed. This last described embodiment can be further characterized as providing that said additional section of said housing contains therein a solenoid assembly comprising a single coil and a piston-like core the latter of which is housed for axial movement into and from the coil and has in connection with the outermost end thereof a rod interenaged with one end of a pivotally mounted lever the opposite end portion of which is positioned to selectively hold said torque transmitting assembly and the said gear thereof in end spaced relation to the engine gear to which they functionally relate and on application of current to said solenoid to retract the core thereof within its housing and move said gear of said torque transmitting assembly into mesh with said engine gear for the transmission therethrough of power to effect the starting of the engine to which it relates. A most preferred embodimemt of an electro-pneumatic starteer provides a control system including signal transmitting means in connection with said power transmitting means, a sensor device continuously functionally related to said signal transmitting means and connected with a microprocessor in said additional housing which is functionally related to said solenoid, a control switch, starter relay and solenoid valves embodied therewith in a control circuit and mutually and selectively operable to control and affect the condition of said solenoid and the selective positioning of its core as dictated at any given time by the condition and/or speed of rotation of said rotor.

The invention also contemplates that selective sections of the starter housing may have sound deadening inserts embodied in connection therewith, in bridging relation to openings therein.

An object of the invention is to provide pneumatic and electro-pneumatic starter and other turbine powered machinery which as compared to apparatus of the prior art having similar use are characterized by the fact that they are more economical to fabricate and assemble, easier to apply to any given application and more efficient, safer and relatively maintenance free in use thereof.

Another object of the invention is to provide means defining new and highly improved, simplistic, turbine rotors and rotor assemblies which are extremely economical to fabricate and use and lend themselves most effectively to a considerable variety of industrial and commercial applications where safety is of utmost importance.

A further object is to provide pneumatic and electro-pneumatic starters and other turbine powered devices featuring said new, highly improved, simplistic turbine rotor and in addition thereto significant improvements in the means and method of the containment and assembly thereof and incorporating means facilitating a most effective and consistent repetitive assured function of the machinery of which they form a part while at the same time insuring against material damage or danger in use thereof.

Another object is to provide a new and improved construction for the housing of pneumatic and electro-pneumatic starters and other turbine powered devices which render such devices more efficient and adaptable in use and simpler and more compact in their construction.

A further object is to provide an engine starter utilizing a drive rotor powered by gaseous fluid wherein the rotor is so constructed and installed as to maximalize its effective use of the energy content of the applied gaseous fluid.

A still further object is to provide an improved turbine powered engine starter which is compact, simplistic in the construction and assembly of its parts, relatively light in weight and substantially reduced in cost as compared to the starters of the prior art applied to similar applications.

An additional object of the invention is to provide a new and improved, relatively compact, electro-pneumatic engine starter wherein the pneumatic and electrical aspects thereof are simply and effectively interrelated in a most compact, safe and highly efficient manner producing as a result thereof maximal safety in use thereof and an extremely quick start up and shutdown of its operation as and when required.

With the above and other incidental objects in view as will more fully appear in the specification, the invention intended to be protected by Letter Patent consists of the features of construction, the parts and combinations thereof, and the mode of operation as hereinafteer described or illustrated in the accompanying drawings, or their equivalents.

Referring to the accompanying drawings, wherein are shown some but obviously not necessarily the only forms of embodiment of the invention, FIG. 1 is a perspective view of an illustrative embodiment of the present invention having the form of a turbine powered engine starter;

FIG. 2 presents a longitudinal sectional view thereof wherein certain parts thereof are displaced for convenience of their disclosure;

FIG. 2a is a plan view of the floating valve shown in FIG. 2;

FIG. 3 is an exploded sectional view of the rotor carrier drive shaft assembly of the starter;

FIG. 4 is an exploded sectional view of the turbine rotor assembly portion of the starter;

FIG. 5 is a perspective view of a buffer incorporated in and forming part of the turbine assembly;

FIG. 6 is a view taken on line 6—6 of FIG. 2;

FIG. 7 is a view of the downstream end of said turbine assembly illustrated in FIG. 4;

FIG. 8 is a sectional view taken on line 8—8 of FIG. 2;

Figure 17:
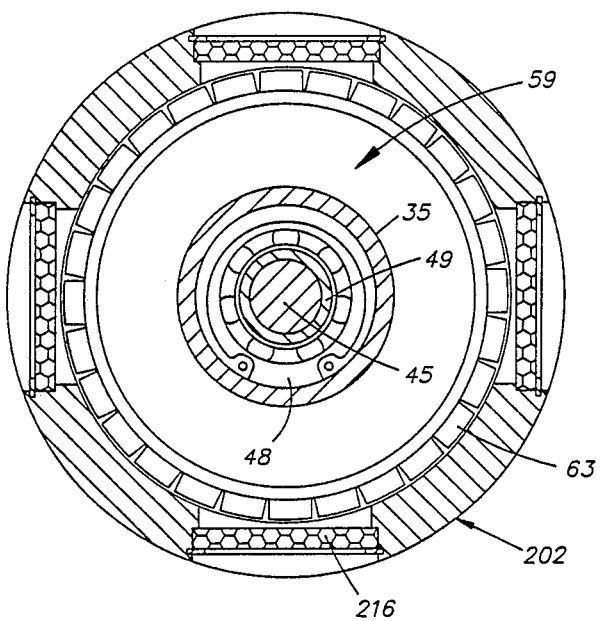
Figure 18:
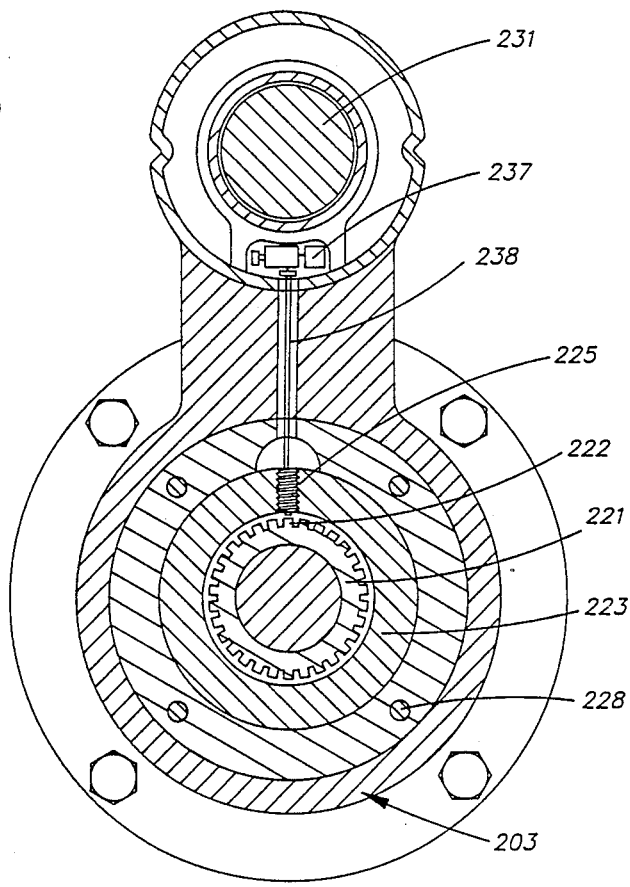

FIG. 9-10 respectively illustrate an elevation view of one face of the turbine rotor and a section of its outer periphery which demonstrates its integrated turbine buckets;

FIG. 11-13 successively illustrate the tripping, tripped and reset conditions of the trip valve and the control system shown in FIG. 1;

FIG. 14 schematically demonstrates the system for application and control of the gaseous fluid which is used to power the turbine rotor and operate the trip valve which is embodied in the starter;

FIG. 15 is a perspective view of an electro-pneumatic powered engine starter constituting a further embodiment of the invention;

FIG. 16 presents a longitudinal sectional view of the starter of FIG. 15 wherein certain parts thereof are displaced for convenience of their disclosure;

FIG. 16a is a view taken on line 16a—16a of FIG. 16;

FIG. 17 is a transverse sectional view taken on line 17—17 of FIG. 16;

FIG. 18 is a sectional view taken on line 18—18 of FIG. 16;

FIG. 19 is a view similar to that of FIG. 16 with the exception that in this instance the starter is shown in an energized condition; and FIG. 20 is an enlarged view of the inlet segment of the turbine assembly shown in FIG. 16; and FIG. 21 schematically demonstrates the system by which the electro-pneumatic starter of FIGS. 15-20 is controlled.

Like parts are identified by like numerals through the several views of the accompanying drawings.

The pneumatic starter illustrated in FIGS. 1-14 includes a housing 10 comprised of four coaxially related sections 11, 26, 80 and 168 end abutted and telescopically interfit in series relation.

Section 11 has a cup-shaped configuration which comprises a base portion 12 peripherally bounded by one end of an integrally connected perpendicularly projected generally tubular wall structure 13. Formed integral with, projected from and perpendicular to a central area of the inner surface of base 12 is a tubular boss 15 the axial extent of which is less than half that of wall 13. Wall 13 is distinguished by two concentric counterbores directed inwardly of the mouth thereof the innermost end of the first of which is immediately of the innermost end of boss 15. The second and relatively larger diameter counterbore produces an inner surface portion 16 of wall 13 the innermost limit of the axial entent of which defines an annular shoulder 14 directly radially inward thereof in a plane adjacent and in spaced parallel relation to the innermost limit of the first counterbore. Directed inwardly of and perpendicular to shoulder 14 are four tapped, circumferentially spaced, bline bores 19.

Housing section 11 nests a press-fit turbine nozzle unit 18 a central body portion of which has a very shallow cup-like configuration defined by a base 21 having a very short perpendicularly projected cylindrical wall structure 22. Integrated with, spaced circumferentially of and projected radially from the outer surface of wall structure 22 is a series of nozzle formations 23. Base 21 is fixedly abutted by screws to position perpendicular to the inner extremity of boss 15 and parallel to base 12 to define therewith a relatively shallow annular chamber 24 bounded at its outermost limit by a base end portion of wall 13. Wall structure 22 is concentric with and in a radially spaced relation to that portion 9 of the inner surface of wall 13 defined between the axially spaced inner limits of the aforementioned counterbores. The radial outermost limits of nozzle formations 23 are set in a tight bearing, axially coextensive relation to wall surface portion 9 of wall 13 to position their axially outermost limis substantially co-planar with shoulder 14.

A circumferentially limited radial portion 17 of base 12 of housing section 11 extending from boss 15 to the outermost surface of wall structure 13 is arcuately offset to increase the depth of chamber 24 and the axial extent of the wall structure 13 within the limits thereof and form part of the bounding wall surface of an inlet port 25 in wall 13, adjacent it base. The diameter of port 25 is greater in dimension than the axial depth of chamber 24 outside the location of said offset to an extent that the opening defines by this port is quite large considering the limited volumetric capacity of chamber 24. Nozzle formations 23 define the only exits from chamber 24.

Port 25 is axially extended outward of wall 13 by a short radially projected tubular boss the inner surface of which is stepped by a counterbore to nest a threadedly engaged ring-shaped adapter 25'. The latter facilitates the coupling thereto of one end of a conduit the opposite end of which connects to a suitable source of gaseous fluid under pressure.

Housing section 26 comprises a relatively thick tubular shell 27 having one end thereof telescopically interfit with the mouth of section 11 so that it forms a coaxial extension of its wall structure 13. The annular end 28 of shell 27 remote from section 11 has a relatively shallow counterbore producing in its inner wall surface a radial, outwardly facing, generally annular shoulder 29. The opposite annular end 30 of shell 27, telescopically interfit with section 11, is cut back at its outer periphery to define thereon an axially offset annular shoulder 31. End surfaces 28, 30 and shoulders 29, 31 are parallel and each in a transverse plane of shell 27 which is perpendicular to its central longitudinally extending axis. Shell 27 has four throughbores 19' extending the length thereof within its radial limits which in the telescopic interfit of housing sections 11 and 26 respectively align with and form a direct extension of one of the tapped blind bores 19 in wall structure 13 of section 11.

An annular web 32 integral with and projected radially inward of shell 27 is located in a spaced, parallel relation to and slightly inward of shoulder 29. A tube integral with the radially innermost edge portion of web 32 projects from and perpendicular to that surface portion thereof remote from shoulder 29 to locate its projected extremity in a concentric co-planar radially spaced relation to end surface 30.

The projected extremity of tube 35 has an annular flange 36 directed radially inward thereof which is counterbored from its outer end to produce thereon a narrow annular outwardly facing shoulder 37 parallel to end surface 30. Filling this counterbore and projecting radially inward thereof is a ring seal assembly 38 a radially outermost portion of one face of which abuts shoulder 37. The radially innermost portion of seal 38 is defined by an axially extended bearing ring 39. One end face of ring 39 is co-planar with the inwardly facing surface of flange 36 and its other end face is co-planar with the projected extremity of tube 35. An annular plastic insert 40 immediately about ring 39 has a portion thereof exposed to serve a sealing function at the outer end face of seal assembly 38.

Projected through, coaxially of and beyond each of the opposite ends of tube 35 is a rotor shaft 41 having a limited portion of its length in bearing relation to ring 39.

Shaft 41 has a configuration providing it with a disc shaped head 47 at one end the diameter of which is greater than that of any of its succeeding sections 46, 45, 44 and 42, which are successively reduced in diameter to its opposite end 43. Resultingly, that face of head 47 immediately of shaft section 46 defines on the outer surface of shaft 41 a radially projected annular shoulder 47' which is in a plane perpendicular to its longitudinal axis and parallel to surface 43. Section 46 has a relatively short axial extent the outer peripheral surface of which is knurled. Its immediately following section 45 is only slightly reduced in diameter and has an axial extent almost as great as that of tube portion 35. Section 44 is very short in length, threaded and modestly reduced in diameter and separated from section 45 by an intervening extremely short slightly relieved portion of the length of shaft 41. Section 42, most remote from head 47, is splined the length thereof and terminates in shaft end surface 43.

The illustrated embodiments of the present invention feature a rotor carrier 50 having a cylindrically configured outer peripheral surface 51, end faces 52 and 53, and a central axial throughbore 54 perpendicular to and opening from the end faces 52 and 53 at their centers. A counterbore 55 directed inwardly of and perpendicular to face 52 of carrier 50 provides it with a cup-shaped configuration the base portion 56 of which has a perpendicularly related wall structure 57 which bounds it shallow interior. The annular inner surface portion of base 56 has an outer diameter the dimension of which is greater than that of shaft head 47 and an inner diameter less than that of head 47, approximately that of shaft section 45, and designed to provide for a press fit of base 56 to and about the knurled shaft section 46.

Wall structure 57 has three tapped throughbores 58 extending the length thereof and through its base in a circularly spaced, concentric, radially spaced relation to its inner and outer wall surfaces and the central axis of carrier 50 which projects through the center of and perpendicular to base 56.

Thus, the inner peripheral surface of annular base 56 being formed and dimensioned to enable the same, for the mount thereof carrier 50 is slipped over end 43 of shaft 41 and, in the course of a relative axial movement therebetween, press fit and securely fixed to and about the knurled shaft section 46. This establishes the radially innermost portion of the inner face of carrier base 56 in an abutted relation to shoulder 47' of shaft 41 and wall structure 57 in a coaxial radially spaced relation to, about and in an outwardly and axially projected relation to, and beyond the shaft head 47 to form thereby a simply achieved, easily fabricated rotor carrier shaft assembly according to the present invention.

End 43 is used as the leading end of carrier shaft assembly 50,41 in the application of shaft 41 to tube 35 by way of the opening defined by flanged end 36 thereof. As assembled to tube 35 of housing section 26, shaft 41 and carrier 50 are so disposed as to establish end face 53 of carrier 50 in an abutted bearing relation to the outer face of seal assembly 38 and an immediately rimming limited radial portion of that end of tube 35 which is co-planar with the annular end surface 30 of shell 27. Shaft section 45, the outer peripheral surface of which is smooth, then has one end thereof immediately of the plane of end surface 30 and extends through and in bearing relation to ring 39, concentric to and to a pint adjacent but short of the base end of tube 35. The following section 44 and its intervening relief are located immediately of the base end of tube 35 and within an interconnected portion of web 32. End section 42 forms a direct extension of threaded section 44, has one end thereof within and in radially spaced concentric relation to web 32 and projects therefrom to position its end surface 43 beyond and in a plane adjacent and in spaced parallel relation to the plane of shoulder 29, short of and parallel to end surface 28 of housing section 26.

Bearing on the inner wall surface of tube 35, between flange 36 and the threaded shaft section 44, are two identical ball bearing assemblies 48 which are axially spaced by a sleeve 49 the ends of which respectively bear on their inner races which commonly with sleeve 49 provide a bearing surface for shaft portion 45. One of the bearing assemblies 48 has one end face of its outer race abutted to the inner face of flanges 36 and the same end face of its inner race abutted to the inner end surface of ring 39. Its outer race is held to flange 36 by a lock ring nested in and projected from and radially inward of the inner surface of tube 35. A coil spring one end of which seats to the outer exposed face portion of this lock ring extends therefrom, coaxially thereof, in a concentric radially spaced relation to sleeve 49 and bearing relation to the inner wall surface of tube 35, to have its opposite end abut the facing outer race of of the second ball bearing 48.

As will be self evident from the drawings, this bearing and biasing structure which lines tube 35 extends about and provides a full bearing surface and balance for the length of shaft section 45 and the elements thereof are set and held in their end abutted relation by a lock nut 44' simply applied about and in threaded engagement with shaft section 44.

A ring shaped internal gear 33 (FIG. 2) lodged in end 28 of shell 27 in a radially spaced concentric relation to the splined outermost end portion of shaft section 42 has a radially outermost portion of one end face thereof abutting shoulder 29, its opposite face parallel to and spaced inwardly from end 28 and its outer peripheral surface bearing on a bounding portion of the inner surface of shell 27. Shaft end surface 43 is essentially coplanar with the outermost face of gear 33.

Carrier 50 mounts in end abutted relation thereto a unique turbine rotor 59, a particularly significant element of the herein described illustrative embodiments of pneumatic and electro-pneumatic starters per the present invention.

Rotor 59 provides a heretofore inobvious highly efficient, most economical, positively functioning, virtually fail safe rotor proven in test as well suited to a multiplicity of applications and having a clear potential of enabling a expansion of the use of turbines to a degree heretofore deemed impractical.

In the selective embodiment thereof herein illustrated rotor 59 comprises a low cost plate-like disc-shaped body possessing the properties of being extremely light in weight, having low tensile strength, an inherent capacity for radial growth, significant impact resistance and toughness and assured function and effectiveness, durability and safety in use well exceeding that of turbine rotors of the prior art.

As will be hereinafter further described, in the use thereof the present invention demonstrates that which has been heretofore inobvious, namely that it is possible to fabricate turbine rotors and rotor assemblies which are inherently light in weight, most efficient and satisfactory in use and free of disastrous malfunction and have a demonstrable absence of physically dangerous fracture or fragmentation under even the most adverse conditions of usage. A derivative benefit is that the housing and related parts of structure which embodies the invention rotor may be safely made more compact and of material which is much less expensive and lighter in weight than that heretofore used for similar purposes.

In preferred embodiments thereof, rotor 59 is a solid integral structure, the material of which, preferably, is a nylon based resin which is free of internal reinforcement. As will be seen, the substance, form and manner of construction of this rotor, as compared to prior art rotors having similar application and rating, affords it with a significantly improved ability to accommodate, distribute and dissipate applied stress and preclude fracture or explosive fragmentation thereof that might be destructive of the structure and machinery in which it is embodied.

As illustrated, the body of rotor 59 exhibits the absence of a central bore and comprises a disk 60 the outermost limit of which is defined by an integrated annular ring 61 the outermost surface 62 of which incorporates a series of conventionally formed, integral, radially projected, circularly spaced turbine buckets 63. The plate-like configuration of disc 60 is such to exhibit distinct radial zones which differ in thickness. These zones comprise a central zone 64 the diametrical dimension of which is greater than that of the head end 47 of the rotor shaft 41 to which the disc relates; an intermediate or mounting zone 65 the radially outermost limit of which has a diameter greater than that of base 56 of wall structure 57 of carrier 50 and a radial zone 66 peripherally bounding zone 65 and bounded at its outermost limit by the ring 61 and its integrated buckets. The axial dimension or thickness of ring 61 and integrated buckets 63 is substantially equal to that of central zone 64.

Within the radial limits thereof the face to face dimension or thickness of zone 66 is substantially uniform and exhibits the minimum face to face dimension or thickness of rotor 59. As compared to zone 66, the face to face thickness of zone 65 is distinctively increaseed to produce, with respect to the basic planes of the outer face portions of zone 66, equal annular outwardly directed axial projections the projected end surfaces of which are in planes essentially parallel to each other and the peripherally bounding plate surfaces of zone 66. Zone 65 is further distinguished by three throughbores 67 which are circularly spaced and located intermeidately of the spaced from its radial limits. The circular spacing and radial positioning of throughbores 67 corresponds to that of throughbores 58 in carrier wall structure 57. Central zone 64 has a thickness modestly greater than that found in zone 65 represented by equal cylindrical projections at each of the opposite faces of disc 60, each of which projections is rimmed by and projects beyond the axial extent of the immediately bounding annular face surface displayed in zone 65. Each of the remote faces defined by the projections of the central zone 64 have three circularly and equidistantly spaced pie-shaped recesses 68 located between and spaced from its radial limits. The base portion of each said recess is in a plane commonly occupied by the most adjacent face portion of zone 66 of disc 60.

Rotor 59 is releasably and securely connected to shaft 41, by way of carrier 50, to position outwardly of, beyond and coaxial with shaft head 47. To this end one face of the mounting portion or zone 65 or rotor 59 is applied to set a radially innermost portion of its annular surface in abutted relation to the projected end surface of carrier wall 57 and place throughbores 67 and 58 in a directly aligned relation. At the same time the projected surface portion of central zone 64 at said one face of rotor 59, being complementarily dimensioned for this purpose, is closely fit within and to the inner surface of wall 57, at its projected extremity.

Fit to overlie a radially innermost portion of the outermost face of zone 65, in bounding relation to the immediate outwardly projected end surface of zone 64, is an appropriately dimensioned clamping ring 69. The outermost face of ring 69 is essentially co-planar with the immediate outermost end surface of zone 65. Ring 69 has three apertures which are circumferentially spaced and positioned to coaxially align in each case with coaxially related throughbores 67 and 58 in rotor 59 and carrier wall structure 57. As so positioned, carrier 50, rotor 59 and ring 69 are fixed in assembled face abutted coaxial series relation by means of screws 70 which are passed through ring 69 and the intermediate zone of rotor 59 to threadedly engage in and releasably anchor to wall 57 of carrier 50.

A rotor-shaft assembly as thus provided is most simplistic, embodies all the advantageous features of its component parts, lends an unusual ease of its assembly and disassembly and in use and application thereof as part of the turbine assembly described provides a most balanced mount of the turbine rotor, achieved on a mere slip fit of the shaft 41 through the tube portion 35 of section 26 of starter housing 10 and an application of a single nut. At the same time base 56 of carrier 50 is securely set to form a direct coaxial extension of tube portion 35 and the projected splined end portion of shaft 41 is positioned within and coaxial with ring gear 33, at its center.

A plastic buffer 71, preferably of material similar to that of rotor 59, forms a distinctive adjunct to starter housing 10 and rotor 59, to the latter of which it functionally relates. Buffer 71 comprises a cylindrically configured tubular body 72 positioned within the mouth of and set within the cup-shaped housing section 11, in slip fit relation to the inner surface portion 16 of its wall structure 13 and in end abutted relation to shoulder 14. So applied, body 72 positions immediately and coaxially of nozzle unit 18 with its outermost end closely adjacent, inwardly of and parallel to the plane of the lip of wall structure 13. The inner surface of body 72 forms, substantially, a direct extension of the inner surface portion of wall 13 defined between the axially spaced inner limits of the two counterbores of wall 13.

The outer peripheral surface 73 of body 72 has four integrally connected, radially projected ribs 74 which are circumferentially and equidistantly spaced and extend the length thereof. It also has eight additional integrally connected, outwardly projected non-radial ribs 75 extending the length thereof. Ribs 75 are arranged in circumferentially spaced pairs, with the ribs of each pair being in parallel relatively closely spaced relation and defining the sides of a channel 76 which they form with a portion of surface 73 which defines their base. Seen in transverse section (FIG. 6), in a plane perpendicular to the longitudinal central axis of body 72, one pair of ribs 75 is located in each quadrant of the circumference of surface 73 in an intermediately positioned, spaced relation to successively adjacent ribs 74 which bound such quadrant. Circumferentially coextensive with one end of body 72 is an external, integrally formed, radially projected flange 77 the radial extent of which corresponds to that of ribs 74 and 75, to the respective ends of which flanges 77 are respectively integrally joined. Flanges 77 have notches therein which align with the respective ends of channels 76, which as thus contrived are arranged in a rectangular pattern.

As here provided, rotor 59 and carrier 50 are positioned outwardly of and beyond the end 30 of housing section 26. In the coaxial, interfit of shell 27 of housing section 26 to wall structure 13 of section 11, the radially innermost portion of annular end portion 30 of shell 27 telescopically interfits within the lip of the mouth of cup shaped section 11 to end abut the outer end of buffer body portion 72 and hold buffer 71 to the shoulder 14, while its outer annular shoulder portion 31 is abutted to the radially outermost portion of said lip. Suitable seals are provided between the abutting surfaces. In the process thereof rotor 59 is positioned within the innermost end portion buffer 71. At the same time the rotor turbine buckets 63 position in an immediately adjacent aligned relation to nozzle formations 23.

Shell 27 has four circumferentially spaced throughbores 19' positioned between and in radially spaced relation to its inner and outer surfaces, concentric therewith, extending therethrough perpendicular to the shoulder surfaces 31 and 29 and opening from the radially innermost portions of surfaces 31 and 29 at the respective ends thereof. In the interfit and interconnection of housing sections 11 and 26, bores 19' align with the bores 19 in section 11.

As previously described, chamber 24 is a relatively shallow annular inlet chamber the diameter of the inlet port 26 of which is quite large considering it limited volumetric capacity. Consequently, on a continuing flow of gaseous fluid thereto, under pressure, by way of port 25, the pressure head which develops on the gaseous fluid so delivered is such to insure the maintenance of a substantially uniform pressured flow thereof through nozzles 23 at a high velocity, enabling thereby the utilization of a large percentage of the energy content of the fluid to drive rotor 59. It resultingly follows that the ensuing spent fluid exiting downstream of rotor 59 is relatively cool and further cooled in its expansion within a chamber 21 peripherally bounding carrier 50 and tube 35. The ends of chamber 21 are defined by rotor 59 and web 32 and the peripherally bounding outer wall of which is mutually defined by adjacent portions of the inner surfaces of buffer body 72 and shell 27. A radial opening in the bottom of shell 27 the diameter of which extends a substantial portion of its axial length is rimmed and radially extended by an even larger diameter outwardly projected tubular boss 39. This contributes a pattern of flow and utilization of the spent fluid which enables it to effectively function to maintain a relatively moderate temperature of the power transmission system of the starter including critical components thereof such as its bearings, seals, controls and gear boxes to which this relatively cool spent fluid has access in its movement through and from a portion of housing section 11 and section 26.

The advantages thereof are believed obvious. It is here noted that the air flow pattern and utilization of spent air just described is not per se part of the present invention. In this respect attention is directed to applicant's co-pending application for U.S. Letters Pat. No. 832,831 herein referred to as the most pertinent prior art.

Housing section 80 which connects with and forms a direct axial extension of section 26 has a stepped end 81,82 the radially innermost portion 81 of which telescopically interfits in end 28 of shell 27 to abut the radially outermost portion of the outer face of gear 33 and clamp it to backing surface 29. At the same time the axially offset radially outermost portion 82, which defines a shoulder on the outer peripheral surface of section 80, abuts end surface 28 of shell 27.

A short portion of the length of wall structure 80 extending between shoulder 82 and the axially outermost limit of an axially spaced radial shoulder 83 formed on its outer peripheral surface has a uniform outer diameter. Shoulder 83, which is parallel to shoulder 82, if formed in an arc which encompasses approximately 270° of the circumferential extent of the outer surface of wall structure 80 and is located in a plane perpendicular to the longitudinal axis of its inner surface 84. That portion of wall structure 80 between its extremity 81,82 and shoulder 83 is distinguished by four circularly spaced, longitudinally coextensive, symmetrically disposed throughbores 85 which open from the perpendicular to shoulder 83 and the surfaces defined by its stepped end 81,82.

In interfit of section 80 to housing section 26, each throughbore 85 is aligned with one of the throughbores 19' of shell 27 and the blind bore 19 aligned therewith to accommodate therein, commonly therewith, the body of a bolt 85 the innermost end portion of which is threadedly engaged in bore 19 and thereby anchored to wall 13 of housing section 11 and the outermost expanded head of which firmly abuts shoulder 83. Housing sections 11, 26 and 80 are thereby quickly and effectively interconnected in a tightly sealed, coaxial, end abutted relation, seals being interposed therebetween in the process thereof.

The length of inner surface 84 of housing section 80 is provided with a stepped configuration corresponding to that which would be effected by four counterbores two of which are directed inwardly of and perpendicular to each of its opposite ends. Therefore, surface 84 will be described in this context. The two counterbores directed inwardly of end portion 81,82 of section 80 define two concentric outwardly facing annular shoulders 87 and 88 having a limited axial spacing and lying in longitudinally spaced planes which are parallel and perpendicular to the longitudinal axis of the bore bounded by surface 84. The radially and axially innermost shoulder 87 is narrow and abutted by the axially innermost face of the outer race of a ball bearing 89, the major portion of the axial extent of the outer peripheral surface of which bears on that portion of surface 84 which extends between shoulders 87 and 88. Shoulder 88 is relatively broad, relatively closely adjacent shell 27, and substantially coextensively seats a releasably interconnected annular retention plate 91 the radially innermost portion of which is appropriately formed to overlap and firmly abut the outer face of the outer race of bearing assembly 89 to fix this bearing against axial movement.

The two counterbores directed inwardly of the opposite annular end surface 90 of section 80 produce two further annular shoulders 95 and 96 in surface 84 which are axially spaced, parallel to shoulders 87,88 and face outwardly of surface 90. Shoulder 95, axially and radially inward of shoulder 96, is broader than and in closely spaced relation to shoulder 87, whereas shoulder 98 is relatively narrow. The distance between shoulders 95 and 96 is appreciably less than that between shoulder 96 and end surface 90. A small radial bore 92 in wall structure 80 opens through surface 84 at a point which is substantially equidistant from shoulder 96 and end surface 90. The outermost end of bore 92 is expanded by a tapped counterbore for the connection thereto of a conduit 93 the purpose of which will be further described.

A power transmitting shaft 100 a portion of the length of which extends through and bears on the inner race of bearing 89 projects through and from the ends of housing section 80, in a radially centered relation to its inner surface 84. A very brief portion of the length of shaft 100 immediately of the downstream end of bearing 89 exhibits a slight relief which is immediately followed by a very short portion 104 which is threaded. Shaft portion 104 mounts a threadedly engaged lock nut which firmly abuts the inner face of the inner race of bearing assembly 89. A portion 97 of the length of shaft 100 immediately of the outer face of bearing assembly 89 is uniformly increased as to its diameter to produce thereon parallel, axially spaced, radially projected annular shoulders 102 and 103, the latter of which firmly abuts the outermost face of the inner race of bearing 89. The inner race of bearing assembly 89 is thereby clamped to and for rotation with shaft 100.

A relatively elongated portion 105 of shaft 100 which immediately follows portion 104 is slightly reduced in diameter, splined and extends to a point adjacent but short of end 90 of housing section 80. The remaining downstream end portion 106 of shaft 100 is quite long, has a smooth peripheral surface and is further reduced and uniform in diameter and the major portion of its length is projected outwardly of end 90 of housing section 80.

The splined end portion of shaft 41 provides a pinion mounting thereabout, in a secured relation thereto, at its projected extremity a pinion 43 which forms a basic part of a planetary gear train providing a speed reduction assembly by means of which shaft 41 is linked in driving relation to the end spaced coaxially related shaft 100. More specifically, pinion 43 is positioned between and in mesh with a plurality of circumferentially spaced planet gears 110 which are co-planar and simultaneously in mesh with the internal ring gear 33. Gears 110 are mounted by needle bearings for free rotation on pivot pins 111 which bridge and have their ends press fit in aligned apertures in axially spaced, coaxially aligned, centrally apertured plates 112. Plates 112 have aligned edge portions which are interconnected by straps (not shown) to form therewith a cage within which gears 110 are supported and protectively contained. This cage is integrally connected to the immediate adjacent head end of shaft 100, by welding (FIG. 2), to form a coaxial extension thereof which is perpendicular thereto.

Shaft 100, its integrated cage and the contents thereof are applied to housing section 80 and bearing assembly 89 prior to the interconnection of section 80 to housing section 26 and by virtue of such interconnection planet gears 110, three in number, are securely placed about and in mesh with pinion 43 to link shaft 41 in driving relation to shaft 100 as and when housing sections 80, 26 and 11 are firmly interconnected by bolts 85.

Nested within housing section 80, by way of its end 90, is a cylindrical sleeve-like piston 130. In its installed position, one end of piston 130 normally seats to a radially outermost surface portion of shoulder 95 and the length of its outer peripheral surface bears on that portion of surface 84 between shoulders 95 and 96 and projects beyond. Integrally connected with and projected radially from the outer end of piston 130 is an external flange 131. The projected edge of flange 131 bears on a bounding portion of surface 84 to define with shoulder 96 the axial limits of a relatively shallow annular chamber 132 the inner and outer peripherally bounding walls of which are respectively provided by portions of the longitudinal extent of the outer surface of piston 130 and inner surface 84 of housing section 80. Each of the outer peripheral surface portion of flange 131 and a portion of the outer surface of the body of sleeve 130 adjacent and spaced from its inner end has formed therein a circumferentially extending groove 133 nesting an O-ring the radially outermost portion of which engages and forms a seal about the sleeve, with its immediate bounding wall surface. The end of sleeve 130 remote from shoulder 95 is counterbored to produce in its inner wall surface an outwardly facing, radial, annular shoulder 134.

Shaft portion 97 has a diametrial bore 120 centered between its axial limits. A counterbore in one end of bore 120 provides an annular shoulder abutted to which is a coaxially related, relatively projected, coil spring 121. Projected through and from bore 120 and spring 121 is a rod 122. Connected with one projected extremity of rod 122 is a symmetrically positioned, weighted, radial head 123 the radially outermost surface 124' of which is formed as a uniform arc. The radially innermost surface of head 123 is flat, perpendicular to said rod, subtends said arc and has a narrow rectangular configuration. In connection with rod 122 and radially inward of head 123 is a rectangular block of material the radially innermost limit of which normally bears on shaft portion 97. At the same time a side surface of this block bears on an outer side surface portion of a plate 112 of the adjacent gear cage. Mounted to and about the projected end portion of rod 122 remote from head 123 is a washer backed by a threadedly engaged nut. The latter is suitably adjusted to apply an appropriate degree of compression to spring 121 to inhibit the radial outward movement of head 123 from shaft portion 97 to any significant degree until when and if the speed of rotation of shaft 100 exceeds a predetermined limit.

Positioned in substantially co-planar relation to and spaced radially outward from head 123, in a circularly displaced relation thereto, is a pivot pin 124 located within and extending transversely of the space defined between retention plate 91 and the adjacent cage plate 112. Pin 124 mounts the hub of a pivotally related lever 125 formed with radially projected, widely divergent, arms 126 and 127. Arm 127 has its projected extremity positioned to be normally radially outward and clear of the apex of surface portion 124' of head 123 as long as the speed of rotation of the turbine rotor and its power transmission shafts do not exceed a predetermined limit. The outer extremity of arm 126 is normally biased thereby to position in the path of the outer extremity of a piston rod 144 housed within and slightly projected from a bore 145 in the wall of the housing section 80.

The surface portion 140 of the projected extremity of arm 127 most adjacent surface 124 is also uniformly arcuate but formed on a smaller radius. The surface portion 141 of arm 127 most remote from surface 124 is flat except for an integrated generally conical projection 142 adjacent its outer extremity which nests within the radially innermost end of a normally aligned backing spring 143, the opposite, radially outermost end of which is appropriately set and securely seated in a backing wall portion of housing section 80. It is under the biasing influence of spring 143 that the outer extremity of arm 126 is normally set to block and limit the projection of piston rod 144.

Having regard for the orientation shown in the drawings, housing section 80 has a relatively narrow portion of the wall structure thereof running lengthwise of its bottom which is relatively narrow in width, increased as to its radial thickness and inclusive of bore 145. The latter is a longitudinally extending axially directed bore the direction of which is perpendicular to shoulder 88 and end surface 90 of housing section 80, from which its ends respectively open.

The downstream end portion of bore 145 which opens from surface 90 has two counterbores which extend the major portion of its length and produce two concentric axially spaced annular shoulders 146 and 147 in its bounding wall surface. The axially innermost shoulder 146 seats one end of an axially directed coil spring 148. The axially outermost shoulder 147 has the radially outermost portion thereof recessed relative to its radially innermost portion. That portion of the bounding wall surface of bore 145 between end surface 90 and shoulder 147 has about two thirds of its axial length, extending from end surface 90, tapped.

The opening from the end of bore 145 in surface 90 is capped by the head of a generally cylindrical plug 150 the reduced diameter body portion of which is applied inwardly of surface 90 to extend a substantial portion of the distance to shoulder 147 in radially spaced relation to its bounding wall, except in the area of two axially spaced, radial, cylindrical projections from its outer surface the axial extent of each of which is short. The radially outermost surfaces of these projections are threadedly engaged with the tapped surface portion of the bounding wall.

A blind bore directed inwardly of the projected extremity of the body portion of the plug 150 extends axially thereof a substantial portion of its length to a point adjacent but spaced from its head to produce for said bore a bounding wall structure having a tubular configuration. Said bounding wall structure is provided with a pair of diametrically aligned apertures intermediate the aforesaid cylindrical projections the latter of which define therebetween an annular chamber 151 of short axial extent having in communication therewith one end of a radial port 152 formed in the bounding wall portion of housing section 80. with plug 150 in place, a ring seal applied about the body portion of the plug immediately of and between its head and the most adjacent of its cylindrical projections biases against the surfaces thereof and the immediately bounding wall portion of surface 84 to seal the entrance to bore 145 to which plug 150 applies. The projected extremity of the tubular wall portion of plug 150 created by said blind bore thereof presents an annular surface 153 the plane of which is perpendicular to the central axis of surface 84. Surface 153 is further distinguished by substantially diametrically opposite radially coextensive notches 154 which are paired.

In the fully installed position of plug 150 the annular surface 153 is located in an adjacent axially spaced relation to the shoulder 147 and a floating valve element 149 is positioned therebetween. Valve element 149 is disc shaped and its outer periphery has a hexagonal configuration.

As seen in the position shown in FIG. 2, piston rod 145 extends through and bears on the bounding wall surface of that portion of bore 145 between shoulders 88 and 146 and projects inwardly of the latter to merge with one end of a larger diameter integrally connected relatively elongate cylindrical piston body portion 155. The diameter of body portion 155 is less than that of the portion of bore 145 between shoulders 146 and 147 except in the location of a cylindrical projection 157 formed integral with and projected radially of its outer surface. The radially outermost surface of projection 157 has a circumferential groove seating an o-ring which projects therefrom to bear on and maintain a seal with its bounding wall surface. Directed inwardly of and perpendicular to the innermost end of piston body portion 155 is a blind bore 156 which extends a substantial portion of its length to position its base in adjacent spaced relation to its opposite end. The wall portion of piston body 155 which bounds the length of bore 156 is provided with diametrically aligned radial bores 158 which open thereto immediately of its inner limit.

Coil spring 148 one end of which is based on shoulder 146 extends therefrom to and about the adjacent end of piston body portion 155 and past the location of the bores 158 to have its opposite end abut the most adjacent face of radial projection 157 (FIG. 2). Spring 148 is effective to apply a bias to piston 155 inducing it to end abut floating valve 149 and seat it to and and in bridging to the annular inner end surface 153 of the plug 150.

As may be readily seen in FIG. 2, an additional radial port 159 directed inwardly of the outer wall surface of housing section 80 opens to the interior of bore 156 adjacent its inner limit. The outer end portion of port 159 is expanded by a counterbore and tapped. There is one further radial passage 170 in the wall structure of housing section 80 the radially outermost end of which opens to bore 156 through a portion of its bounding wall surface to a space about the body of piston 155 between radial projection 157 and shoulder 147 and the radially innermost end of which has a lateral opening to chamber 132.

The air valve assembly above described, a simply integrated internally provided part of the subject starter, provides an overspeed trip valve that functions when and if, for any reason whatsoever, the turbine rotor of the starter of which it forms a part exceeds a prescribed speed of its rotation.

A torque transmitting tubular drive assembly mounted to and about the splined portion 105 and end portion 106 of shaft 100 includes a housing 160 a necked portion of the length of which defines a groove 162 in and circumferentially of its outer peripheral surface adjacent and spaced from one end 161 thereof. Lodged in, circumferentially of and contained to the base of groove 162 is an annular plastic ring structure 164 the radial extent of which provides it with an outer diameter larger than that of any portion of the length of housing 160. Housing 160 is annular in transverse section and includes an inner wall surface one end portion of the length of which, including its end 161, is formed to have a splined sliding male-female interengagement thereof (not shown) with the splined surface of portion 105 of shaft 100. The remaining following portion of the length of the inner wall surface of housing 160 is radially offset relative to the said splined portion thereof to be of a diameter complementary to that of shaft portion 106. Fixed to and circumferentially of the reduced outer diameter of a portion of housing 160 at the end thereof remote from end 161 is a gear 165 the teeth of which are appropriately formed to mesh with the teeth of the ring gear E of the engine to which the starter of which it forms a part must relate in the course of its intended use.

In installation of said torque transmitting drive assembly it is moved over and inwardly of the projected extremity of shaft portion 106 to not only effect a splined sliding engagement thereof to and about splined shaft portion 105 but to also bring a radially outermost portion of the innermost face of ring structure 164 into abutment with shoulder 134 of the sleeve-like piston 130. A longitudinally extended heavy coil spring 166 is applied to and immediately about housing 160 to seat one end thereof to a radially outermost portion of the outer face of ring 164.

Further detail of the aforesaid torque transmitting drive assembly has not been described since such is well known and may correspond to that of commercially available products of this type exemplified, for example, in that product of Facet Enterprises, Inc. identified by its trademark "FACET POSITORK PLUS". This assembly is therefore referred to and described herein only to the extent necessary for the understanding of an operation of a pneumatic starter per the illustrated embodiment of the present invention.

As will be seen, spring 166 is contained and firmly seated and the starter housing completed by a secure telescopic interfit of the remaining housing section 168 with end portion 90 of section 80. The projected end of shaft portion 106 is then supported for rotation in and relative to a bearing 107 by which it is contained in the outermost end of housing section 168. Adjacent and spaced from the innermost tubular end portion of housing section 168, which is generally tubular in character and slip fit within and to the inner surface of tubular section 80 at the end 90 of housing section 80 is an external flange 108 one face of which abuts end surface 90 and is fixed thereto by axially applied screws. Housing section 168, which is thus attached to and forms a direct axial extension of sections 11, 26 and 80, has a streamlined configuration cut away at what may be considered the bottom of its outer end portion to provide an opening to expose an underportion of section 106 of shaft 100 and gear 165 so the starter may be appropriately positioned and the teeth of gear 165 directly aligned with and placed in axially spaced relation to the teeth of the engine flywheel to which it must relate for its required application and function as and when necessary.

The above described embodiment of the present invention which is illustrated in FIGS. 1–14 exhibits a system of its controls facilitating in use thereof a preengagement of the teeth of its gear 165 with the ring gear E of the engine it is required to start.

The simple system to control the operation and function of the starter above described can be best understood with reference to such details as are schematically illustrated in FIG. 14. As there shown, a source 180 of fluid under pressure is placed in continuous communication with a normally closed three way, spool type, relay valve 188 which in one mode of its adjustment illustrated communicates, by way of a delivery line 181, with a normally closed control valve 182. When opened, by manual or automatic operation thereof, valve 182 passes fluid under pressure received from line 181 to and through a delivery line 184, to port 152 and, by way of chamber 151 and the blind bore in plug 150, through the notches 154 in the projected extremity of plug 150, which is at this point abutted and bridged by valve 149. From this point the air under pressure moves through the passages defined at the outer peripheral edge of valve 149 to and about the reduced diameter portion of the body of piston 155 which then holds valve 149 in bridging relation to the inner extremity of plug 150. This pressured flow of air then exits, by way of radial bore 170, to chamber 132 at its radially innermost limit to apply the air, continuously delivered under pressure, between shoulder 96 and flange 131 at the leading end of piston 130. Fluid pressure so applied to and maintained on flange 131 is transmitted to ring structure 164 and through it to the torque transmitting drive assembly 160, which is then in a non-rotative condition. Resultingly, assembly 160 is influenced thereby to slide axially and outwardly on shaft 100 to have the teeth of its gear 165, previously aligned for this purpose, inherently and smoothly mesh with the teeth of ring gear E of the engine flywheel to which the starter must relate in the course of its intended use.

The described axial outward movement of piston 130 is against the bias of spring 166, which is compressed thereby to store energy. At the same time, immediately of that point when gear 165 is meshed with ring gear E, flange 131 of piston 130 moves beyond port 92, which is thereby placed in direct communication with the now axially enlarged chamber 132. Air continues to flow to chamber 132, under pressure, by way of port 152 to maintain gear 165 in continuous mesh with ring gear E.

During this procedure excess of the continuing air flow so delivered inherently moves outwardly of chamber 132 and back to valve 188 by way of port 92 and a return flow line 186, under pressure. As air reenters valve 188 the pressured flow thereof is applied to and induces a movement of the spool therein in known manner to then provide for a flow of fluid from source 180 to the inlet port 25 of the end cap 11 of the starter housing by way of a conduit 185, as a result of which to power rotor 59 as previously described. The construction and arrangement of the control system is such that there is virtually no delay between pre-engagement and energization of the starter.

As the flow of air under pressure from conduit 185 moves to, through and from the shallow chamber 24 and by way of nozzle formations 23 directly impacts on rotor buckets 63 of nozzle unit 18, the substantial energy content of the flow thus imposed applies instantaneously and maintains, from first impact, a significant driving force on the extremely light plastic rotor 59. The result is not only an instantaneous start up but a most rapid acceleration of the rotor causing it to reach its rated operating speed within a very brief interval of time with no adverse stress being evidenced in the rotor.

A feature of significance exhibited in use of rotor 59, verified in the course of extensive testing procedures, is that by virtue of its construction, compared to prior art turbine rotors of similar size, it exhibits a substantially reduced level of stress. The preferred plate-like form of rotor 59 illustrated results in an optimalized distribution of any stresses that it might experience in the course of its use. Attention is also directed to the fact that rotor 59, particularly in the preferred nylon based embodiment herein described, is not only endowed with low tensile strength but characterized by radial growth without weakness. Tests have indicated that while the tensile strength of this rotor is low, its elongation at 73° F., for example, exceeded 200%. A most significant feature is evidenced by the fact that rotor 59 is in no case subject to fracture or explosive fragmentation within the scope of its contained usage in turbine powered machinery. At worst, should there be a radial expansion of the rotor by virtue of which its outer periphery will come into positive frictional contact with its bounding wall surface, that portion of the rotor subjected to friction in this manner will reduce to a powder form, precluding damage to equipment or direct injury to personnel as a consequence thereof. This will be further discussed in reference to the function of the apparatus for shutting down the starter in the event of excessive speed of rotation of the rotor. One further point to be noted is that the particular complementary shroud or liner serving as a buffer and for containment of rotor 59 provides an additive safety factor and enhances the inherent substantial efficiency of rotor 59 in operation. Another important feature of the rotor in combination with its buffer is that the rotor may then effectively operate with essentially zero tip clearance losses.

Tests have also shown that in use of a rotor per the invention one may effect a reduction of what is generally considered the required tip clearance of a rotor and at the same time achieve an increase in starting torque.

A particularly significant derivative of rotors per the invention, also established by test in use thereof, is that their coasting time on shut down is negligible. By contrast, the length of the coasting time of prior art rotors has in many instances been the source of damage on the occasion of an effort to re-start an engine before their coasting interval has been completed.

Should the speed of rotation of rotor 59 and correspondingly the proportional speed of rotation of shaft 41 exceed the preset limit thereof during the operation of the starter, triggering device 122, 123 is substantially instantaneously thrown radially outward of shaft 100 so that in the course of the rotation of shaft 41, irrespective of the direction of its rotation, its surface 124 will strike the portion 140 of arm 127 and drive it radially outward against the bias of spring 143 to pivot lever 125 and displace arm 126 sufficiently for it to clear the projected extremity of piston and rod unit 155,144.

Due to the continuing flow of pressure fluid to the blind bore of plug 150 and its continuing metered passage at this time to and about valve 149 to the annular chamber defined about the inner portion of piston body 155 in the course of its movement to chamber 132, a substantial build up of pressure occurs not only behind valve 149 but also behind the radial projection 157 on piston 155. As a result thereof, simultaneous with the displacement of arm 126 from its blocking relation to the outwardly projected end of piston rod 144, valve 149 and rod and piston unit 144,155 are thrown forward of and displaced from the end surface 153 of plug 150 and axially displaced from each other. In the process thereof valve 149 bridges and forms a seal across valve seat 147 and the forward limit of the piston body portion 155 at the inner end of rod 144 seats against shoulder 146 in throughbore 145. As will be obvious, the pressure fluid delivered to the blind bore of plug 150 is precluded thereby from passage to chamber 132 and at the same time the forward displacement of piston body 155 exposes the diametrically opposed apertures 158 and the interior of bore 156 to port 130. As a result thereof, port 130 is placed in direct communication with chamber 132 and bore 92, residual air in which then inherently exhausts and is vented therefrom by way of port 130 to the atmosphere. At the same time the signal to relay valve 188 by way of line 93 terminates whereupon the relay spool responds to instantaneously terminate all flow from source 130 to port 25, correspondingly effecting a very quick shut down of the starter. As a consequence of the decay of pressure in all areas of the starter, the piston and rod unit 155,144, under the influence of spring 148, is forced back against floating valve 149 and moves therewith to reseat valve 149 and hold it across and in a biased relation to end 153 of plug 150. At the same time rod 122 and head 123 are inherently retracted to their original positions and as this occurs the bias of spring 143 rocks lever 125 to position the outer end of its arm 126 over and in blocking relation to the projected extremity of rod 144. As a result thereof air within chamber 32 is immediately vented from the system by way of vent plug 159. The fast resetting operation which thus occurs produces automatically a complete shut down of the starter, without material damage thereto and prevents any possibility of gaseous signal fluid being admitted to the inlet of the starter until as and when required.

With more particular reference to the composition and characteristics for radial growth with which rotor 59 is endowed, it is to be understood that as rotor 59 radially expand it will reach a point during normal operating speeds that it will make rubbing contact with the inner wall surface of buffer 71 which constitutes a shroud. By virtue of the significant low coefficient friction between the rotor and buffer 71 no wear can be experienced thus enabling zero tip clearances and providing improved efficiency of the turbine motor. At elevated speeds of rotation of the rotor as occurs in overspeed with reference to rated operating speeds there is a continued radial elongation of the rotor body which increases the force of the rubbing contact to the extent there is wear of the peripheral tips of rotor buckets 63, in the course of which to limit and prevent any further gain in the speed that the turbine may obtain. This overspeed limitation is accomplished smoothly and without high energy impact or fracture and little or no heat developing as a consequence thereof. The failure mode of rotor 59 has been thoroughly tested and it demonstrates that as a consequence of overspeed, particularly in the frame of reference of preferred embodiments of the invention, that there results in all instances that the only consequence thereof there is a harmless powder residue composed of the material rubbed off the buckets 63. This taken together with the fact that, as shown by tests utilizing a nylon resinous base material around the rotor, within the operational speed range of rotor 59 and modifications thereof which include its basic material feature the expansion of the rotor is contained with little wear.

As mentioned previously tests have shown that plastic rotors per the invention, particularly in the frame of reference of its use in the improved starters herein described exhibit significantly lower rotating inertia and negligible coastdown time, without brake assist, as compared to the coastdown times of prior art rotors having similar application. The reduction in coastdown time achieved in use of turbine rotors per the present invention has been found to be as much as about 90% of that experienced in use of the prior art.

While the molding of turbine rotors using nylon based resins is much preferred, under some circumstances and for some applications it could be practical to use polycarbonate or acetal resins or their equivalent in properties.

FIGS. 15–21 illustrate the electro-pneumatic starter of the invention certain primary features, elements of construction and components of which correspond to those illustrated in and described with reference to the pneumatic starter of FIGS. 1–14. In this respect all parts of the embodiment of FIGS. 15–21 which are identical to similar parts of the embodiment of FIGS. 1–14 are designated by like numerals.

The apparatus of the starter of FIGS. 15–21 includes a starter housing 200 formed of five sections, sections 201, 202, 203, and 168 of which are interconnected in a communicating telescopically interfit series relation, and section 229 which is a control section superposed with reference to and in open communication with the interior of section 203. There are ppropriate seals between these sections.

Section 201 has a very shallow cup-shaped configuration the interior of which is uniform in cross section and the base 205 of which has a central port 206 of large diameter as compared to the diameter of base 205. Port 206 is peripherally rimmed at the outermost surface of base 205 by a short perpendicularly projected boss 207. Boss 207 is lined with a suitably interconnected sleeve-like adapter 208 the axial extent of the inner surface of which is tapped for the interconnection therewith of a line for the delivery thereto and therethrough, from a source 209, of air under pressure.

Nested within and in shrunk fit relation to the mouth of section 201 is a turbine nozzle unit 18 the outermost face portion of which is co-planar with annular surface 210 defining the projected extremity of the tubular wall structure peripherally bounding the interior of section 201.

Section 202, which generally corresponds to section 26 of the first described embodiment, is uniformly tubular, coaxial with and forms a direct extension of section 201. A counterbore of that end thereof most adjacent housing section 201 produces in its inner wall surface a radially oriented annular shoulder 212 which in the interfit of the adjacent end portions of sections 201 and 202 positions in directly aligned, axially spaced facing relation to annular surface 210. Lodged between surface 210 and shoulder 212, in the wall defined by section 202, is a short tubular buffer 71 the details of which have been clearly described with reference to its application and use in the embodiment of FIGS. 1–14. The end of section 202 remote from shoulder 210 has an inwardly directed counterbore producing on its inner wall surface an outwardly facing radial annular shoulder 217 which is parallel to shoulder 212.

Formed in the axial length of the bounding wall structure of housing section 201 is a series of circumferentially spaced tapped throughbores 21 which align with tapped blind bores in the abutted end portion of section 202. These aligned bores accommodate the application thereto of bolts which threadedly engage to and fix sections 201 and 202 in their telescopically interfit coaxial relation. Formed in the body of section 202, intermediate its ends is a series of circularly spaced openings fixed in bridging relation to each of which is a complementarily shaped sound disseminator 216 comprised in this instance of phenol fiber. Lodged in end 28 of section 202 is a ring gear 33. Gear 33 is in a radially spaced concentric relation to the splined outermost end portion of section 42 of a shaft 41. Shaft 41 is supported for rotation in axially spaced bearings within the limits of and by means in connection with the wall structure defining housing section 202. The construction and arrangement of shaft 41 and the support thereof is in a manner corresponding to that previously described with reference to the application of shaft 41 in section 26 of the embodiment represented in FIGS. 1–14 of the drawings. A portion of the end of shaft 41 relatively adjacent the coaxially related nozzle unit 18 securely mounts a rotor carrier 50 which in turn mounts a rotor 59 as in the first described embodiment. The arrangement is such to position rotor 59 immediately outward of the projected extremity 210 of section 201 and immediately of nozzle unit 18 and coaxially therewith, to align its buckets 63 with nozzle formations 23. As so positioned, rotor 59 is within the limits of buffer 71 by which it is peripherally bounded and immediately contained.

Also positioned within the limits of section 202 is a caged speed reduction assembly the planetary gear train of which is in mesh with internal ring gear 33 and the pinion defined by the projected end portion of section 42 of shaft 41. This cage assembly is fixedly connected with and perpendicular to one end of shaft 100 which is thereby linked for rotation by rotor 59 through the medium of its interrelated drive shaft 41.

The detail of all that structure and all the fixed and operative components of the starter within the interior of the tubular wall defining section 202 of housing 200 and their interrelation and function, except as herein limited, is identical with that shown and described in the detailed disclosure of the pneumatic starter of FIG. 1–14, reference to which is clearly available if necessary. Under these circumstances a further detailed description thereof with reference to the embodiment of FIGS. 15–21 appears unnecessary as it would be exhaustively redundant and serve no useful purpose. The same remarks apply to the form of shaft 100 and the slidable torque transmitting tubular drive assembly 160 mounted to and about its splined shaft portion 105 and end portion 106. As in the first instance gear 165 is normally positioned, in the inoperative condition of the starter, in an aligned axially spaced relation to the flywheel E of the engine to which it relates with its teeth rotatively offset with respect to the teeth of the ring gear rotation of the flywheel.

Shaft 100 extends through tubular housing section 203 and its end abutted coaxially related end section 168 to have its projected extremity supported for rotation in and relative to a bearing 107 by which it is contained in the projected extremity of housing section 168. Shaft 100 is additionally supported by an axially spaced bearing 89 located in an adjacent axially spaced relation to its opposite extremity. One face of the inner race of bearing 89 abuts shoulder 103 defined by a diametrically enlarged portion of shaft 100 while the same face of its outer race abuts a shoulder formed in a bounding portion of the inner wall surface of housing section 203. The opposite face of the inner face of bearing 89 is abutted by one face of a signal ring 221 the outermost peripheral surface of which is distinguished by circumferentially and equidistantly spaced radial projections 222. Ring 221 is suitably secured to and about a portion of the length of shaft section 105 in the process of which to contain the inner race of bearing 89 against axial movement with reference to shaft 100. A tubular element 223 applied to and about the section 105 of shaft 100 and ring 221 has one end thereof abutted to the outer race of bearing 89 to prevent its axial movement with reference to shoulder 220 and the other end thereof beyond and in abutment with the downstream end of torque transmitting assembly 160. The inner wall surface of element 223 is stepped as if by counterbores directed inwardly of that end thereof which abuts and contains the outer race of bearing 89. That portion of the axial length of the inner surface of tubular element 223 which is peripheral to ring 221 is closely adjacent and in radially spaced relation to the outer limits of its radial projections 222 and has therein a radial bore in which a frequency sensor device 225 is lodged. The device 225 has an exposed head end through the medium of which it continuously observes and transmits a signal of the speed of rotation of shaft 100 as and when its rotation occurs. The inner surface portion of tubular element 223 beyond and in axially spaced relation to ring 221 is stepped to produce thereon a pair of successive axially spaced radial shoulders the radial innermost limits of which are successively more closely related to shaft 100 and in part accommodate a ring shaped bearing seal applied to and about this shaft. Intermediate the axial length thereof, beyond the sensor device 225 the outer peripheral surface of tubular element 223 is distinguished by a radially projected flange 226 one face of which abuts an annular shoulder 227 formed in that portion of the inner surface of housing section 203 which immediately bounds the periphery of said flange. Flange 226 is clamped and suitable secured to shoulder 227 by bolts 228.

Immediately outward of and beyond flange 226, in the direction and short of the remote end of section 203 which is interfit with section 168, which corresponds in shape and application to section 168 of the first described embodiment of the present invention, section 203 has a radial bore 229 rimmed at its outer surface by a tubular projected extension thereof having a right angled bend at its outer limit reversely directed to extend for a short distance over, adjacent and in spaced parallel relation to an end portion of the outer surface of housing section 202 which is interfit with section 203. Capping this projected limit of this right angled outward extension of radial bore 229 is a cup shaped housing portion 230 of solenoid unit 231' the longitudinal axis of which is parallel to that of shaft 41 and its extension 100. The movable core 231 of solenoid 230 is linked by an interconnected axially projected rod 232 extending through a suitably anchored, resilient, bellows shaped sleeve 233 anchored at its inner end to and about a portion of the solenoid housing and at its outermost end to and about a portion of rod 232. Beyond the outer end of sleeve 233, rod 231 projects through a central aperture in a plate which defines the outer limit of the bellows, a limiting abutment thereof being provided by a clip ring 234 suitably secured to and projected radially of rod 231. The projected extremity of rod 232 is interconnected by a crossbar 235 with the stirrup shaped upper end of a lever 250 the opposite stirrup shaped end of which straddles the channel 162 defined by and in the necked portion of the torque transmitting assembly 165.

Lever 250 is pivotally mounted intermediate the length thereof for rotating movement on and with reference to a pivot pin 252 which is anchored to bridge the upward extension of section 203 to form the control section 229. The end of the control section 229 remote from the lever 250 is capped and mounts therein balancing springs serving to accommodate and cushion the retraction of core 231 of the solenoid and to store energy sufficient to condition the core for its opposite movement when the solenoid is deenergized. Suitable terminals T are provided for delivery current to the coil 231' of the solenoid.

The operation of the control portion of the electro-pneumatic starter illustrated can be best understood with reference to FIG. 21 of the accompanying drawings. As there demonstrated, a circuit is provided incorporating a sensor 225, a microprocessor 237, solenoid 231, 231' containing a core 232 and control 182 for the relay valve 188 referenced to requirements for delivery of air under pressure or the termination thereof. Also included in the circuit is a battery B and a switch S.

The components of this system are so interrelated to provide that when the switch S is closed current flows from the battery to the microprocessor. The microprocessor then closes connecting the solenoid to the battery (this occuring only if the frequency of rotation of rotor 59 is zero). Simultaneously with the connection of the solenoid to the battery the starter is energized by means of the retraction of the solenoid core 231 as a result of which lever 250 is rocked to induce a sliding movement of torque transmitting assembly 160 which places gear 165 in mesh with the ring gear E of the engine to which the starter relates.

In the retraction of solenoid core 231 the innermost end thereof abuts the adjacent end of a rod 240 coaxial therewith to move it rearwardly against the bias of springs 243 and 244 interposed between which is an annular contact switch plate 242 fixed to and about rod 240 to project radially outward therefrom beyond the radial outward limits of the springs. To the rear of the radially projected portion of switch plate 242 and in the path thereof are two terminals T mounted to, projected through and inwardly of the cap 245 for the end of the control section 229 remote from lever 250. Connected to the terminals T are leads which connect to the solenoid coil 230. When the solenoid core 231 is fully retracted the rod 240 has the end thereof remote from the core projected sufficiently into the cap 245 sufficiently to have the switch control plate seat in bridging relation to the rearwardly positioned terminals T, thereby closing a circuit to energize the valve control device 182. Given a full and complete mesh of gear 165 with ring gear E at this time the relay valve 182 is then activated to direct air under pressure to the inlet chamber of the starter and by virtue of the high pressure head developed therein due to the limited volumetric capacity of this chamber and the maintenance of the air flow to the chamber there is a maximum output as the air moves through the nozzles and impacts thereon with little energy lost in the process. By reason of the form and the substance of the extremely light material of the invention rotor and the relatively stress-free balanced operation of the rotor by virtue of the nature and form of its positioning in connection to the power transmission shaft to which it relates, there is a substantial amount of starting torque developed which contributes to an essentially immediate starting of the related engine. As the engine starts a signal thereof is reflected in the microprocessor which opens the solenoid at a prescribed predetermined pre-set frequency level as referenced to the speed of rotation of the rotor. All this contributes to a virtually delay free disengagement of the starter from the engine. As the starter is disengaged from the engine, the air relay valve closes, immediately terminating flow for air to the starter and at the same time the microprocessor loses its current and is now ready for its next cycle of starter operation. The micro-processor is so conditioned that it will always open the solenoid when the starter switch is open and the frequency signal is below the set point. Correspondingly, in the event the speed of rotation of the rotor should exceed its expressed design limit, the signal so developed to be transmitted to the micro-processor and the solenoid will open and all the controls will function virtually instanteously.

Note is made of the fact that the low inertia factor referred to previously results in a termination of the rotation of the starter virtually in no more than a few seconds, after there is a signal that speed of rotation has been exceeded or the engine has been started.

Note should also be taken of a possibly inobvious fact, namely that the use of a single coil solenoid in this particular instance insures that the current load required in operation of the control system here provided for electro-pneumatic starters is high only for a matter of seconds, as the starter is engaged to the ring gear, subsequent to which the load immediately drops by over 90%. Another feature importantly contributing to a maximalized use of applied energy in use of the present invention is inherently present by reason of the fact that the inventive features of the present rotor enable the operation thereof with essentially a zero tip clearance.

As will be self-evident from the foregoing description of the embodiments of the invention and their features, the construction and arrangement of the starters and the components thereof dictates optimal safety and maximum efficiency based on equipment that has a relatively low capital cost. This is apart from the fact that the embodiments of the invention and their components are relatively small and compact, materially light in weight as compared to prior art devices of the same nature and very easy to install and service. Furthermore the character of the invention embodiments is such to insure, with reasonable care and usage thereof, an extended operating life and minimal and inexpensive maintenance procedures being required in the course thereof.

From the above description it will be apparent that there is thus provided a device of the character described possessing the particular features of advantage before enumerated as desirable, which obviously is susceptible of modification in its form, proportions, detail construction and arrangement of parts without departing from the principle involved or sacrificing any of its advantages.

While an order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A turbine rotor comprising a plastic body including a disc portion having a ring portion peripheral thereto embodying turbine buckets formed integral with, projected radially from and spaced circumferentially of its outermost peripheral surface, said disc portion having a plate-like configuration distinguished by radial zones which differ in thickness including a solid central zone exhibiting its maximum thickness and a zone outwardly thereof of less thickness including means through which said rotor may be mounted for its connection to a shaft.

2. A turbine drive assembly including the apparatus of claim 1 further comprising a rotor drive shaft, means secured to one end portion of said shaft to position outwardly of the periphery thereof and project, at least in part, to effectively define an extension of said shaft and said zone of said plastic body located outwardly of said central zone thereof having at least a portion of one face thereof releasably connected with said means defining an extension of said shaft to fix said rotor body outwardly of, beyond and substantially coaxial with said one end portion of said shaft.

3. An engine starter including the apparatus of claim 1 further comprising a starter housing composed of interfitting, interconnected, series related sections, one of said sections defining a substantially cup-shaped end portion of said housing, means defining a turbine nozzle unit within and in adjacent relatively closely spaced relation to the base of said cup-shaped end portion, in transversely bridging relation to the bounding wall portion thereof and defining at the base end of said cup a shallow chamber having an inlet for delivery of air thereto under pressure, said nozzle unit including a circularly spaced series of nozzles defining the only outlets from said chamber, said rotor being nested in said cup-shaped end portion of said housing in a recessed spaced relation to its mouth to position the buckets thereof in axial alignment with said nozzles, said cup-shaped end portion further nesting a rotor carrier mounting said rotor as an axial extension thereof, said carrier being interconnected with said rotor to establish a portion of one face of said zone thereof which is outwardly of said central portion of said rotor in abutment therewith.

4. Apparatus as in claim 3 including a power transmission shaft having an expanded head portion at one end followed by a knurled surface portion thereof which is relatively short in length and relatively reduced in diameter, beyond which the diameter of said shaft is further reduced along the length thereof and extended through and in bearing relation to means within the section of said housing immediately following said cup shaped section, said carrier being mounted in secured connection to and about said knurled portion of said shaft to project outwardly therefrom and about and beyond said head portion of said shaft to form an axial extension thereof and position said rotor body coaxial therewith.

5. A turbine rotor, particularly advantageous for use in and application to the drive shaft of pneumatic and electro-pneumatic engine starters, comprising a solid disc-shaped body formed of a nylon based resin, the outer peripheral limit of said body being defined by a series of circumferentially spaced turbine buckets inwardly of which said body has a solid, plate-like configuration, said body being structured to have low tensile strength, high impact resistance, inherent radial self adjustment in correspondence with changing speed of its rotation and a reduction to power form in those areas thereof which are subjected to friction to such time as the speed of its rotation rises to and above a predetermined level and said disc shaped body having a central zone the dimension of which corresponds substantially to that of the end of the shaft to which it is intended to apply and a zone outward of said central zone intermediate its radial limits including means through which said rotor is mounted by way of an adapter to a peripheral surface portion of the shaft to which it applies to position said central zone of said body to form an axial extension of said shaft and connect said rotor in a driving relation to said shaft.

6. Apparatus as in claim 5 including an adapter having a generally cylindrical configuration one end portion of which connects to, about and peripherally of one end portion of the shaft to which said rotor drivingly relates, the length of said adapter providing for the opposite extremity thereof of position outwardly of the adjacent end of the shaft and said rotor being secured in bridging relation to said opposite extremity of said adapter to position said central zone thereof in facing relation to the adjacent end of the shaft.

7. Apparatus as in claim 5 including an adapter wherein said adapter has a cup-shaped configuration and constitutes a rotor carrier, said carrier comprising a generally annular base and a perpendicularly related wall structure bounding its interior, said base being adapted for a secure mount thereof to, about and peripherally of one end portion of a shaft to which said rotor is intended to drivingly relate, said wall structure mounting said rotor in a relatively bridging relation to the mouth thereof, which is remote from said base, to position said rotor outwardly of and beyond the adjacent end of the shaft to which the carrier mounts to establish the central zone thereof in a facing axially spaced relation to the adjacent end of the shaft.

8. A turbine rotor, particularly advantgeous for use in and application to the drive shaft of pneumatic and electro-pneumatic engine starters, said rotor comprising a substantially disc-shaped body, the outermost limit of said body being defined by an integrated annular ring the outermost surface of which incorporates a series of integrally connected, radially projected, circularly spaced turbine buckets, said body having a plate-like configuration and distinct radial zones including a central zone exhibiting the absence of a central bore and having a diameter the dimension of which is greater than that of the end of the shaft to which said body is intended to drivingly relate and an intermediate or mounting zone a portion of which provides means facilitating the mount of said body in driving relation to the shaft to which said rotor must apply the energy which it receives and transmits in the rotation thereof.

9. A turbine rotor according to claim 8 wherein said rotor includes an additional radial zone immediately of said annular ring which has a face to face dimension which is smaller than that of said intermediate zone and said body is structured of a nylon based resin.

10. Apparatus as in claim 8 wherein said body is distinguished by having said zones thereof differ in their face to face thickness.

11. Apparatus as in claim 10 wherein said central zone of said body has the respectively opposite face portions thereof outwardly projected with respect to the corresponding opposite face portions of that zone of said body which is in a relatively immediately bounding relation thereto.

12. An engine starter including a turbine rotor, particularly advantageous for use in and application to the drive shaft of pneumatic and electro-pneumatic engine starters, comprising a solid disc-shaped body formed of a nylon based resin, the outer peripheral limit of said body being defined by a series of circumferentially spaced turbine buckets inwardly of which said body has a solid, plate-like configuration, said body being structured to have low tensile strength, high impact resistance, inherent radial self adjustment in correspondence with changing speed of its rotation and a reduction to power form in those areas thereof which are subjected to friction at such time as the speed of its rotation rises to and above a predetermined level, said starter further comprising a starter housing composed of interconnected, series related sections, one of said sections defining a substantially cup-shaped end portion of said housing, means defining a turbine nozzle unit within and in adjacent relatively closely spaced relation to the base of said cup-shaped end portion, in transversely bridging relation to the bounding wall portion thereof immediately of its mouth and defining at the base end of said cup a very shallow chamber having an inlet for delivery of air thereto under pressure, said nozzle unit including a circularly spaced series of nozzles defining the only outlets from said chamber, said rotor being set within the section of said housing immediately following said cup-shaped end portion to position the buckets thereof in immediately adjacent axial alignment with said nozzles, said following section nesting a rotor carrier mounting said rotor as a coaxial extension thereof, said carrier being interconnected with said rotor to establish a portion of one face of said zone thereof which is outwardly of said central portion of said rotor in abutment therewith.

13. Apparatus as in claim 12 including a power transmission shaft, said carrier being secured to one end portion of said shaft to form a coaxial extension thereof, said shaft being extended through and in bearing relation to means within a third section of said housing immediately of said following section and having the opposite end portion thereof in coupled relation to power transmission means extending through further sections of said housing to position an engine drive gear forming part thereof in an adjacent spaced relation to the gear to which it applies to start a related engine.

14. Apparatus as in claim 13 wherein said third section of said housing has a plurality of sound deadening inserts embodied in connection therewith, in bridging relation to openings therein.

15. An electro-pneumatic pre-engage starter including the apparatus of claim 14 comprising a further section of said housing beyond said third section having an opening therein communicating with an additional section of said housing, said power transmitting means including a splined shaft portion thereof slidably mounting a torque transmitting drive assembly including said engine drive gear and means in connection therewith for triggering and controlling the movements thereof to and from the engine gear to which said engine drive gear relates, respectively in a substantially instantaneous response to the energization of said rotor to mesh with said engine gear and effect the starting of said engine and at such time as the engine has started or the speed of rotation of said rotor and correspondingly said transmission means exceeds the designed level of their operating speed.

16. Apparatus as in claim 15 characterized in that said additional section of said housing contains therein a solenoid assembly comprising a single coil and a piston-like core the latter of which is housed for axial movement into and from the coil and has in connection with the outermost end thereof a rod opposite end portion of which is positioned to selectively hold said torque transmitting assembly and the said gear thereof in end spaced relation to the engine gear to which they functionally relate and on application of current to said solenoid to retract the core thereof within its housing and move said gear of said torque transmitting assembly into mesh with said engine gear for the transmission therethrough of power to effect the starting of the engine to which it relates.

17. Apparatus as in claim 16 including signal transmitting means in connection with said power transmitting means, a sensor device continuously functionally related to said signal transmitting means and connected with a microprocessor in said additional housing which is functionally related to said solenoid, a control switch, starter relay and solenoid valves embodied therewith in a control circuit and mutually and selectively operable to control and affect the condition of said solenoid and the selective positioning of its core as dictated at any given time by the condition and/or speed of rotation of said rotor.

* * * * *

UNITED STATES PATENT AND TRADEMARK OFFICE
CERTIFICATE OF CORRECTION

PATENT NO. : 4,960,085

DATED : October 2, 1990

INVENTOR(S) : Terry Coons

It is certified that error appears in the above-identified patent and that said Letters Patent is hereby corrected as shown below:

Col. 1, line 37, "oin" is corrected to read -- in --;

line 59, "provided" IS corrected to read -- provide --.

Col. 2, line 26, "turbin" is corrected to read -- turbine.

Col. 3, line 30, "is" is inserted following "buffer";

line 60, "abutmemt" is corrected to read -- abutment --.

Col. 4, line 52, "embodimemt" is corrected to read -- embodiment --;

line 53, "starteer" is corrected to read -- starter --.

Col. 5, line 2, "starter" is corrected to read -- starters --;

line 53, "Letter" is corrected to read -- Letters;

line 55, "hereinafteer" is corrected to read -- hereinafter --.

Col. 6, line 12, "Fig." is corrected to read -- Figs. --;

line 16, "Fig." is corrected to read -- Figs. --;

line 61, "entent" is corrected to read -- extent --;

line 66, "bline" is corrected to read -- blind --.

UNITED STATES PATENT AND TRADEMARK OFFICE
CERTIFICATE OF CORRECTION

PATENT NO. : 4,960,085

DATED : October 2, 1990

INVENTOR(S) : Terry Coons

It is certified that error appears in the above-identified patent and that said Letters Patent is hereby corrected as shown below:

Col. 7, line 17, "limis" is corrected to read -- limits --;

line 24, "it" is corrected to read -- its --;

line 27, "defines" is corrected to read -- defined --.

Col. 8, line 41, "it" is corrected to read -- its --.

Col. 9, line 11, "pint" is corrected to read -- point --;

29, "flanges" is corrected to read -- flange --.

Col. 10, line 54, "increaseed" is corrected to read -- increased --;

lines 61-62 - "intermeidately" is corrected to read -- intermediately --;

line 62, "the" (first occurrence) is corrected to read -- and --.

Col. 11, line 12, "or" (second occurrence) is corrected to read -- of --.

Col. 12, line 45, "it" is corrected to read -- its --.

Col. 13, line 26, "if" is corrected to read -- is -- line 33, "the" is corrected to read -- and --.

UNITED STATES PATENT AND TRADEMARK OFFICE
CERTIFICATE OF CORRECTION

PATENT NO.  : 4,960,085
DATED       : October 2, 1990
INVENTOR(S) : Terry Coons

It is certified that error appears in the above-identified patent and that said Letters Patent is hereby corrected as shown below:

Col. 14, line 11, "98" is corrected to read -- 96 --;

Col. 16, line 60, "with" is corrected to read -- "With".

Col. 23, line 67, "face (second occurrence) is corrected to read -- race --.

Col. 24, line 37, "suitable" is corrected to read -- suitably --.

Col. 26, line 7, "for" is corrected to read -- of --;

line 57, "an" is corrected to read -- in --.

Col. 27, last line, (Cl. 5, line 11) "power" is corrected to read -- powder --.

Col. 28, line 1, (Cl. 5, line 12), amend "to" (second to read -- at --;

line 18, (Cl. 6, line 6) "of" (first occurrence) is corrected to read -- to --.

UNITED STATES PATENT AND TRADEMARK OFFICE
CERTIFICATE OF CORRECTION

PATENT NO. : 4,960,085

DATED : October 2, 1990

INVENTOR(S) : Terry Coons

It is certified that error appears in the above-identified patent and that said Letters Patent is hereby corrected as shown below:

Col. 29, line 12, (Cl. 12, line 12) "power" is corrected to read -- powder -- .

Col. 30, line 25, (Cl. 16, line 6), following "rod", insert --interegaged with one end of a pivotally mounted lever the--.

UNITED STATES PATENT AND TRADEMARK OFFICE
CERTIFICATE OF CORRECTION

PATENT NO. : 4,960,085

DATED : October 2, 1990

INVENTOR(S) : Terry Coons

It is certified that error appears in the above-identified patent and that said Letters Patent is hereby corrected as shown below:

Col. 2, line 24, "satifactory" is corrected to read -- satisfactory --;

line 36, "applocations" is corrected to read -- applications --;

line 40, delete "which" (first occurrence).

Col. 4, lines 41-42, "interenaged" is corrected to read -- interengaged --.

Col. 9, line 38, "of" (second occurrence) is deleted;

line 65, "a" (first occurrence) is corrected to read -- an --.

Col. 17, line 38, "and" (second occurrence) is deleted;

line 38, -- relation -- is inserted following "bridging".

Col. 21, line 36, "expand" is corrected to read -- expands --.

UNITED STATES PATENT AND TRADEMARK OFFICE
CERTIFICATE OF CORRECTION

PATENT NO. : 4,960,085
DATED : October 2, 1990
INVENTOR(S) : Terry Coons

It is certified that error appears in the above-identified patent and that said Letters Patent is hereby corrected as shown below:

Col. 22, line 26, "ppropriate" is corrected to read -- appropriate --.

Col. 25, line 11, -- of -- is inserted following "delivery".

Signed and Sealed this

Third Day of March, 1992

Attest:

HARRY F. MANBECK, JR.

Attesting Officer

Commissioner of Patents and Trademarks